United States Patent
Fujie et al.

(10) Patent No.: US 9,670,364 B2
(45) Date of Patent: Jun. 6, 2017

(54) COMPOUND HAVING XANTHENE SKELETON, COLORANT COMPOSITION, INK FOR INKJET RECORDING, INKJET RECORDING METHOD, INKJET PRINTER CARTRIDGE, AND INKJET RECORDING MATERIAL

(71) Applicant: FUJIFILM Corporation, Minato-ku, Tokyo (JP)

(72) Inventors: Yoshihiko Fujie, Fujinomiya (JP); Keiichi Tateishi, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/083,806

(22) Filed: Mar. 29, 2016

(65) Prior Publication Data

US 2016/0208102 A1   Jul. 21, 2016

Related U.S. Application Data

(63) Continuation of application No. PCT/JP2014/074920, filed on Sep. 19, 2014.

(30) Foreign Application Priority Data

Sep. 30, 2013   (JP) ................. 2013-205795

(51) Int. Cl.
C09D 11/328 (2014.01)
C09B 11/24 (2006.01)

(52) U.S. Cl.
CPC ............ *C09B 11/24* (2013.01); *C09D 11/328* (2013.01)

(58) Field of Classification Search
CPC .................................. C09D 11/328
See application file for complete search history.

(56) References Cited

U.S. PATENT DOCUMENTS

| 2006/0230545 | A1* | 10/2006 | Lagrange | ................ | A61K 8/498 |
| | | | | | 8/405 |
| 2008/0237553 | A1* | 10/2008 | Miya | ........................ | C08F 2/50 |
| | | | | | 252/586 |
| 2013/0319287 | A1* | 12/2013 | Fujie | ....................... | C09B 11/24 |
| | | | | | 106/31.43 |
| 2014/0176653 | A1 | 6/2014 | Fujie et al. | | |
| 2014/0305336 | A1 | 10/2014 | Fujie et al. | | |
| 2016/0327858 | A1* | 11/2016 | Sasaki | ..................... | C09B 11/28 |

FOREIGN PATENT DOCUMENTS

| JP | 09255882 A | * | 9/1997 |
| JP | 2012-233033 A | | 11/2012 |
| JP | 2013-49776 A | | 3/2013 |
| WO | 2013031838 A1 | | 3/2013 |
| WO | 2013099677 A1 | | 7/2013 |

OTHER PUBLICATIONS

Translation of communication dated Sep. 17, 2015 issued by the International Searching Authority in counterpart International Patent Application No. PCT/JP2014/074920 (PCT/IPEA/409).
International Search Report dated Dec. 2, 2014 issued by the International Searching Authority in counterpart International Application No. PCT/JP2014/074920 (PCT/ISA/210).
Written Opinion dated Dec. 2, 2014 issued by the International Searching Authority in counterpart International Application No. PCT/JP2014/074920 (PCT/ISA/237).
Communication dated Sep. 17, 2015 issued in International Application No. PCT/JP2014/074920 (PCT/IPEA/409).
Communication dated Sep. 13, 2016, from the Japanese Patent Office in counterpart application No. 2015-539174.

* cited by examiner

*Primary Examiner* — Shelby Fidler
(74) *Attorney, Agent, or Firm* — Sughrue Mion, PLLC

(57) ABSTRACT

There is provided a compound which is represented by General Formula (1) below:

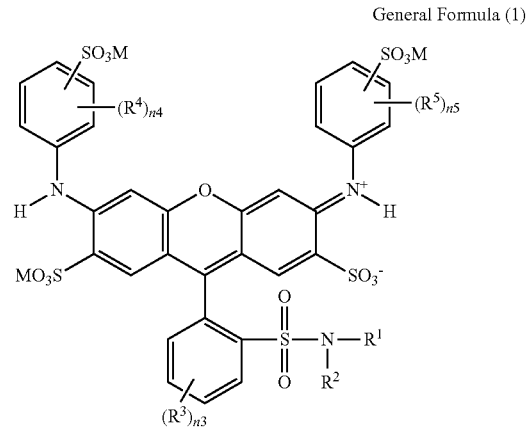

General Formula (1)

in General Formula (1), $R^1$ and $R^2$ each independently represent a hydrogen atom, substituted or unsubstituted alkyl group, a substituted or unsubstituted aryl group, or a substituted or unsubstituted heterocyclic group, $R^3$, $R^4$, and $R^5$ each independently represent a substituent group, M represents a hydrogen atom or a counter cation, each of M may be the same or different, n3, n4, and n5 each independently represent a number between 0 and 4, and $R^3$, $R^4$, and $R^5$ may be the same or different in a case where n3, n4, and n5 each represent a number equal to or greater than 2.

9 Claims, 1 Drawing Sheet

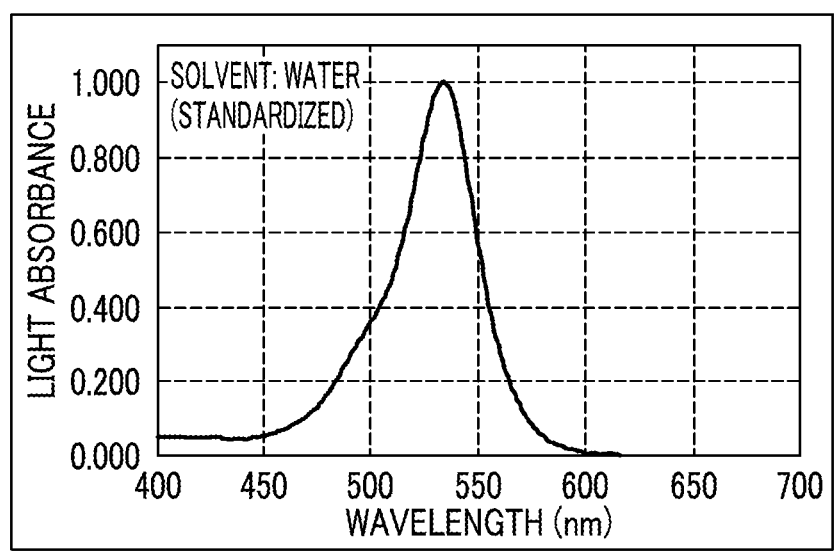

COMPOUND HAVING XANTHENE SKELETON, COLORANT COMPOSITION, INK FOR INKJET RECORDING, INKJET RECORDING METHOD, INKJET PRINTER CARTRIDGE, AND INKJET RECORDING MATERIAL

CROSS REFERENCE TO RELATED APPLICATION

This is a continuation of International Application No. PCT/JP2014/074920 filed on Sep. 19, 2014, and claims priority from Japanese Patent Application No. 2013-205795 filed on Sep. 30, 2013, the entire disclosures of which are incorporated herein by reference.

BACKGROUND OF THE INVENTION

1. Field of the Invention

The present invention relates to a compound which has a xanthene skeleton, a colorant composition which includes the compound described above, a dye, an ink for inkjet recording, an inkjet recording method, an inkjet printer cartridge, and an inkjet recording material.

2. Description of the Related Art

As is known in the art, an inkjet recording method is a method for printing by causing small droplets of ink to fly and attach to a recording medium such as paper. With this printing method, it is possible to quickly and easily print high quality images with high resolution using an inexpensive apparatus and, particularly in color printing, techniques have been developed in recent years for image forming methods which may substitute for photographs.

In a case of forming a color image using an inkjet recording method, at least a yellow ink, a magenta ink, a cyan ink, and a black ink are generally used. In the prior art, water-based inks are mainly used as these inkjet inks from the viewpoints of safety, odor, the risk of fire, and the like. For these inks, there is a demand for characteristics such as physical properties such as viscosity and surface tension to be in appropriate ranges, excellence in terms of nozzle clogging and preservation stability and producing high density recorded images, and, moreover, excellence in terms of light fastness, ozone resistance, water resistance, moisture resistance, and the like.

Most of these performances are satisfied by using a water-based ink which has water or a mixture of water and a water-soluble organic solvent as a main solvent; however, color tone, saturation, light fastness, ozone resistance, water resistance, moisture resistance, and the like are greatly affected by the coloring agent and research has been carried out on various dyes in the prior art.

WO2013/099677A describes a compound which has a xanthene skeleton in which four sulfo groups are substituted and a colorant composition which includes the compound described above is excellent in image fastness and printing density.

In addition, JP2012-233033A describes a compound which has a xanthene skeleton in which an alkylsulfamoyl group is substituted.

However, there is a demand for further improvement in the performance with regard to the field of dyes and there is a demand for a compound which has excellent printing density and which is able to further improve image fastness such as light fastness and moisture resistance.

SUMMARY OF THE INVENTION

The present invention has an object of providing a compound and a colorant composition, which have excellent printing density and which are able to form images with excellent image fastness such as light fastness, ozone resistance, and moisture resistance. In addition, the present invention has an object of providing an ink for inkjet recording which contains the compound described above and the colorant composition described above, an inkjet recording method which uses the ink for inkjet recording described above, an inkjet printer cartridge, and an inkjet recording material.

That is, the present invention is as follows.

[1] A compound which is represented by General Formula (1) below.

General Formula (1)

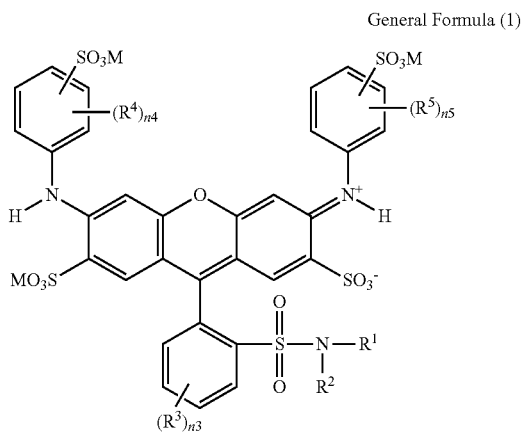

In General Formula (1), $R^1$ and $R^2$ each independently represent a hydrogen atom, a substituted or unsubstituted alkyl group, a substituted or unsubstituted aryl group, or a substituted or unsubstituted heterocyclic group, $R^3$, $R^4$, and $R^5$ each independently represent a substituent group, and M represents a hydrogen atom or a counter cation. Each of M may be the same or different. n3, n4, and n5 each independently represent a number between 0 and 4, and $R^3$, $R^4$, and $R^5$ may be the same or different in a case where n3, n4, and n5 each represent a number equal to or greater than 2.

[2] The compound according to [1] described above, in which at least one of $R^1$ and $R^2$ represents a secondary alkyl group or a tertiary alkyl group.

[3] The compound according to [1] or [2] described above, in which $R^3$, $R^4$, and $R^5$ each independently represent a halogen atom, an aryl group, an alkoxy group, an alkyl group, an acyl amino group, an alkyl or aryl sulfonyl amino group, or an alkyl or aryl ureide group.

[4] The compound according to any one of [1] to [3] described above, in which M represents a lithium ion, a sodium ion, or a potassium ion.

[5] A colorant composition which contains the compound according to any one of [1] to [4] described above.

[6] An ink for inkjet recording which includes the colorant composition according to [5] described above.

[7] An inkjet recording method which uses the ink for inkjet recording according to [6] described above.

[8] An inkjet printer cartridge which is filled with the ink for inkjet recording according to [6]described above.

[9] An inkjet recording material forming a color image on a target recording material using the ink for inkjet recording according to [6] described above.

The compound and the colorant composition of the present invention have an excellent printing density and are able to form images with particularly excellent light fastness, ozone resistance, and moisture resistance. In addition, the present invention provides an ink for inkjet recording which contains the compound and the colorant composition described above, an inkjet recording method which uses the ink for inkjet recording described above, an inkjet printer cartridge, and an inkjet recording material.

BRIEF DESCRIPTION OF THE DRAWINGS

FIG. 1 is a diagram which represents an absorption spectrum in a diluted aqueous solution of the exemplary compounds (1-7).

DESCRIPTION OF THE PREFERRED EMBODIMENTS

Detailed description will be given below of the present invention.

First, a substituent group group A will be defined in the present invention.

(Substituent Group Group A)

Examples of the substituent groups of group A include a halogen atom, an alkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxy carbonyloxy group, an amino group, an acyl amino group, an amino carbonyl amino group, an alkoxy carbonyl amino group, an aryloxy carbonyl amino group, a sulfamoyl amino group, an alkyl or an aryl sulfonyl amino group, a mercapto group, an alkylthio group, an arylthio group, a heterocyclic thio group, a sulfamoyl group, an alkyl or an aryl sulfinyl group, an alkyl or an arylsulfonyl group, an acyl group, an aryloxy carbonyl group, an alkoxy carbonyl group, a carbamoyl group, an aryl or a heterocyclic azo group, an imide group, a phosphino group, a phosphinyl group, a phosphinyloxy group, a phosphinyl amino group, a silyl group, an ionic hydrophilic group. These substituent groups may be further substituted and examples of further substituent groups include groups which are selected from the substituent group A described above.

Examples of halogen atoms include a fluorine atom, a chlorine atom, a bromine atom, or an iodine atom.

Examples of alkyl groups include alkyl groups which take a straight-chain form, a branched form, a substituted or unsubstituted cyclic form, and encompass a cycloalkyl group, a bicycloalkyl group, tricyclo structures with a large number of cyclic structures, and the like. Alkyl groups in the substituent groups which will be described below (for example, an alkyl group of an alkoxy group or an alkylthio group) also represent alkyl groups according to such a concept.

Preferable alkyl groups include an alkyl group with 1 to 30 carbon atoms, for example, a methyl group, an ethyl group, an n-propyl group, an i-propyl group, a t-butyl group, an n-octyl group, an eicosyl group, a 2-chloroethyl group, a 2-cyanoethyl group, a 2-ethylhexyl group and the like, preferable examples of the cycloalkyl groups include a substituted or unsubstituted cycloalkyl group with 3 to 30 carbon atoms, for example, a cyclohexyl group, a cyclopentyl group, a 4-n-dodecyl cyclohexyl group, and the like, preferable bicycloalkyl groups include a substituted or unsubstituted bicycloalkyl group with 5 to 30 carbon atoms, that is, a monovalent group obtained by removing one hydrogen atom from bicycloalkane with 5 to 30 carbon atoms, for example, a bicyclo [1,2,2]heptane-2-yl group, a bicyclo [2,2,2]octane-3-yl group, and the like.

Examples of aralkyl groups include substituted or unsubstituted aralkyl groups, and the substituted or unsubstituted aralkyl group is preferably an aralkyl group with 7 to 30 carbon atoms. Examples thereof include a benzyl group and a 2-phenethyl group.

Examples of alkenyl groups include a substituted or unsubstituted alkenyl group which takes a straight-chain form, a branched form, or a cyclic form, and encompass cycloalkenyl groups and bicycloalkenyl groups.

Preferable examples of alkenyl groups include a substituted or unsubstituted alkenyl group with 2 to 30 carbon atoms, for example, a vinyl group, an allyl group, a prenyl group, a geranyl group, an oleyl group, and the like, preferable examples of cycloalkenyl groups include a substituted or unsubstituted cycloalkenyl group with 3 to 30 carbon atoms, that is, a monovalent group obtained by removing one hydrogen atom from a cycloalkene with 3 to 30 carbon atoms, for example, a 2-cyclopentene-1-yl group, a 2-cyclohexen-1-yl group, and the like, examples of the bicycloalkenyl groups include a substituted or unsubstituted bicycloalkenyl group, preferably a substituted or unsubstituted bicycloalkenyl group with 5 to 30 carbon atoms, that is, a monovalent group obtained by removing one hydrogen atom from a bicycloalkene which has one double bond, for example, a bicyclo [2,2,1]hept-2-en-1-yl group, a bicyclo [2,2,2]oct-2-en-4-yl group, and the like.

Preferable examples of alkynyl groups include a substituted or unsubstituted alkynyl group with 2 to 30 carbon atoms, for example, an ethynyl group, a propargyl group, a trimethylsilylethynyl group, and the like.

Preferable examples of aryl groups include a substituted or unsubstituted aryl group with 6 to 30 carbon atoms, for example, a phenyl group, a p-tolyl group, a naphthyl group, a m-chlorophenyl group, an o-hexadecanoyl aminophenyl group, and the like.

Preferable examples of heterocyclic groups include a monovalent group obtained by removing one hydrogen atom from a 5- or 6-membered, substituted or unsubstituted, aromatic or non-aromatic, heterocyclic compound, more preferably, a 5- or 6-membered aromatic heterocyclic group with 3 to 30 carbon atoms, for example, a 2-furyl group, a 2-thienyl group, a 2-pyrimidinyl group, a 2-benzothiazolyl group, and the like. Examples of non-aromatic heterocyclic groups include a morpholinyl group and the like.

Preferable examples of alkoxy groups include a substituted or unsubstituted alkoxy group with 1 to 30 carbon atoms, for example, a methoxy group, an ethoxy group, an isopropoxy group, a t-butoxy group, an n-octyl group, a 2-methoxyethoxy group, and the like. Preferable examples of aryloxy groups include a substituted or unsubstituted aryloxy group with 6 to 30 carbon atoms, for example, a phenoxy group, a 2-methyl phenoxy group, a 4-t-butyl phenoxy group, a 3-nitrophenoxy group, a 2 tetradecanoyl amino phenoxy group, and the like.

Preferable examples of silyloxy groups include a substituted or unsubstituted silyloxy group with 0 to 20 carbon atoms, for example, a trimethylsilyloxy group, a diphenylmethylsilyl group, and the like.

Preferable examples of heterocyclic oxy groups include a substituted or unsubstituted heterocyclic oxy group with 2 to 30 carbon atoms, for example, a 1-phenyltetrazole-5-oxy group, a 2-tetrahydropyranyloxy group, and the like.

Preferable examples of acyloxy groups include a formyloxy group, a substituted or unsubstituted alkylcarbonyloxy group with 2 to 30 carbon atoms, a substituted or unsubstituted arylcarbonyloxy group with 6 to 30 carbon atoms, for example, an acetyloxy group, a pivaloyloxy group, a stearoyloxy group, a benzoyloxy group, a p-methoxyphenyl carbonyloxy group, and the like.

Preferable examples of carbamoyloxy groups include a substituted or unsubstituted carbamoyloxy group with 1 to 30 carbon atoms, for example, an N,N-dimethyl carbamoyloxy group, an N,N-diethyl carbamoyloxy group, a morpholinocarbonyloxy group, an N,N-di-n-octyl amino carbonyloxy group, an N-n-octyl carbamoyloxy group, and the like.

Preferable examples of alkoxy carbonyloxy groups include a substituted or unsubstituted alkoxy carbonyloxy group with 2 to 30 carbon atoms, for example, a methoxy carbonyloxy group, an ethoxy carbonyloxy group, a t-butoxy carbonyloxy group, an n-octyl carbonyloxy group and the like.

Preferable examples of aryloxy carbonyloxy groups include a substituted or unsubstituted aryloxy carbonyloxy group with 7 to 30 carbon atoms, for example, a phenoxy carbonyloxy group, a p-methoxyphenoxy carbonyloxy group, a p-n-hexadecyloxy phenoxy carbonyloxy group, and the like.

Examples of amino groups include an alkyl amino group, an aryl amino group, a heterocyclic amino group, preferable examples of the amino groups include a substituted or unsubstituted alkyl amino group with 1 to 30 carbon atoms and a substituted or unsubstituted anilino group with 6 to 30 carbon atoms, for example, a methyl amino group, a dimethyl amino group, an anilino group, an N-methyl-anilino group, a diphenyl amino group, a triazinyl amino group, and the like.

Preferable examples of acyl amino groups include a formyl amino group, a substituted or unsubstituted alkyl carbonyl amino group with 1 to 30 carbon atoms, and a substituted or unsubstituted aryl carbonyl amino group with 6 to 30 carbon atoms, for example, an acetyl amino group, a pivaloyl amino, a lauroyl amino group, a benzoyl amino group, a 3,4,5-tri-n-octyloxyphenyl carbonyl amino group, and the like.

Preferable examples of amino carbonyl amino groups include a substituted or unsubstituted amino carbonyl amino group with 1 to 30 carbon atoms, for example, a carbamoyl amino group, an N,N-dimethyl amino carbonyl amino group, an N,N-diethyl amino carbonyl amino group, a morpholino carbonyl amino group, and the like.

Preferable examples of alkoxy carbonyl amino groups include a substituted or unsubstituted alkoxy carbonyl amino group with 2 to 30 carbon atoms, for example, a methoxy carbonyl amino group, an ethoxy carbonyl amino group, a t-butoxy carbonyl amino group, an n-octadecyloxy carbonyl amino group, an N-methyl methoxy carbonyl amino group, and the like.

Preferable examples of aryloxy carbonyl amino groups include a substituted or unsubstituted aryloxy carbonyl amino group with 7 to 30 carbon atoms, for example, a phenoxy carbonyl amino group, a p-chlorophenoxy carbonyl amino group, an m-n-octyloxy phenoxy carbonyl amino group, and the like.

Preferable examples of sulfamoyl amino groups include a substituted or unsubstituted sulfamoyl amino group with 0 to 30 carbon atoms, for example, a sulfamoyl amino group, an N,N-dimethyl amino sulfonyl amino group, an N-n-octyl amino sulfonyl amino group, and the like.

Preferable examples of alkyl or aryl sulfonyl amino groups include a substituted or unsubstituted alkylsulfonyl amino group with 1 to 30 carbon atoms, a substituted or unsubstituted arylsulfonyl amino group with 6 to 30 carbon atoms, for example, a methylsulfonyl amino group, a butyl sulfonyl amino group, a phenylsulfonyl amino group, a 2,3,5-trichlorophenyl sulfonyl amino group, a p-methylphenyl sulfonyl amino group, and the like.

Preferable examples of alkylthio groups include a substituted or unsubstituted alkylthio group with 1 to 30 carbon atoms, for example, a methylthio group, an ethylthio group, an n-hexadecylthio group, and the like.

Preferable examples of arylthio groups include a substituted or unsubstituted arylthio group with 6 to 30 carbon atoms, for example, a phenylthio group, a p-chlorophenyl thio group, an m-methoxyphenylthio group, and the like.

Preferable examples of heterocyclic thio groups include a substituted or unsubstituted heterocyclic thio group with 2 to 30 carbon atoms, for example, a 2 benzothiazolylthio group, a 1-phenyltetrazole-5-ylthio group, and the like.

Preferable examples of sulfamoyl groups include a substituted or unsubstituted sulfamoyl group with 0 to 30 carbon atoms, for example, an N-ethyl sulfamoyl group, an N-(3-dodecyloxypropyl) sulfamoyl group, an N,N-dimethyl sulfamoyl group, an N-acetyl sulfamoyl group, an N-benzoylsulfamoyl group, an N-(N'-phenylcarbamoyl) sulfamoyl group, and the like.

Preferable examples of alkyl or aryl sulfinyl groups include a substituted or unsubstituted alkylsulfinyl group with 1 to 30 carbon atoms, a substituted or unsubstituted arylsulfinyl group with 6 to 30 carbon atoms, for example, a methylsulfinyl group, an ethylsulfinyl group, a phenylsulfinyl group, a p-methylphenyl sulfinyl group, and the like.

Preferable examples of alkyl or aryl sulfonyl groups include a substituted or unsubstituted alkylsulfonyl group with 1 to 30 carbon atoms and a substituted or unsubstituted arylsulfonyl group with 6 to 30 carbon atoms, for example, a methylsulfonyl group, an ethylsulfonyl group, a phenylsulfonyl group, a p-methylphenyl sulfonyl group, and the like.

Preferable examples of acyl groups include a formyl group, a substituted or unsubstituted alkylcarbonyl group with 2 to 30 carbon atoms, a substituted or unsubstituted aryl carbonyl group with 7 to 30 carbon atoms, a heterocyclic carbonyl group with 2 to 30 carbon atoms which is bonded with a carbonyl group by substituted or unsubstituted carbon atoms, for example, an acetyl group, a pivaloyl group, a 2-chloroacetyl group, a stearoyl group, a benzoyl group, a p-n-octyloxyphenylcarbonyl group, a 2-pyridyl carbonyl group, a 2-furyl carbonyl group, and the like.

Preferable examples of aryloxy carbonyl groups include a substituted or unsubstituted aryloxy carbonyl group with 7 to 30 carbon atoms, for example, a phenoxy carbonyl group, an o-chlorophenoxy carbonyl group, an m-nitrophenoxy carbonyl group, a p-t-butyl phenoxy carbonyl group, and the like.

Preferable examples of alkoxy carbonyl groups include a substituted or unsubstituted alkoxy carbonyl group with 2 to 30 carbon atoms, for example, a methoxy carbonyl group, an ethoxy carbonyl group, a t-butoxy carbonyl group, an n-octadecyloxy carbonyl group, and the like.

Preferable examples of carbamoyl groups include a substituted or unsubstituted carbamoyl group with 1 to 30 carbon atoms, for example, a carbamoyl group, an N-methyl carbamoyl group, an N,N-dimethyl carbamoyl group, an N,N-di-n-octyl carbamoyl group, an N-(methylsulfonyl) carbamoyl group, and the like.

Preferable examples of aryl or heterocyclic azo groups include a substituted or unsubstituted arylazo group with 6 to 30 carbon atoms and a substituted or unsubstituted heterocyclic azo group with 3 to 30 carbon atoms, for example, phenylazo, p-chlorophenyl azo, 5-ethylthio-1,3,4-thiadiazol-2-ylazo, and the like.

Preferable examples of imide groups include an N-succinimide group, an N-phthalimide group, and the like.

Preferable examples of phosphino groups include a substituted or unsubstituted phosphino group with 0 to 30 carbon atoms, for example, a dimethyl phosphino group, a diphenyl phosphino group, a methyl phenoxy phosphino group, and the like.

Preferable examples of phosphinyl groups include a substituted or unsubstituted phosphinyl group with 0 to 30 carbon atoms, for example, a phosphinyl group, a dioctyloxy phosphinyl group, a diethoxy phosphinyl group, and the like.

Preferable examples of phosphinyloxy groups include a substituted or unsubstituted phosphinyloxy group with 0 to 30 carbon atoms, for example, a diphenoxy phosphenyloxy group, a dioctyloxy phosphinyloxy group, and the like.

Preferable example of phosphinyl amino groups include a substituted or unsubstituted phosphinyl amino group with 0 to 30 carbon atoms, for example, a dimethoxy phosphinyl amino group, a dimethyl amino phosphinyl amino group, and the like.

Preferable examples of silyl groups include a substituted or unsubstituted silyl group with 0 to 30 carbon atoms, for example, a trimethylsilyl group, a t-butyldimethylsilyl group, a phenyl dimethylsilyl group, and the like.

Examples of an ionic hydrophilic group include a sulfo group, a carboxyl group, a thiocarboxyl group, a sulfino group, a phosphono group, a dihydroxyphosphino group, a quaternary ammonium group, and the like. A sulfo group and a carboxyl group are particularly preferable. In addition, the carboxyl group, the phosphono group, and the sulfo group may be in a salt state and examples of counter cations which form salts include ammonium ions, alkali metal ions (for example, lithium ions, sodium ions, and potassium ions), and organic cations (for example, tetramethyl ammonium ions, tetramethyl guanidium ions, and tetramethyl phosphonium) and lithium salt, sodium salt, potassium salt, and ammonium salt are preferable, sodium salt or a mixed salt which has sodium salt as the main component is more preferable, and sodium salt is most preferable.

Here, in the present invention, in a case where the compound is a salt, the salt is present in a water-soluble ink after being dissociated with the ions.

[Compound Represented by General Formula (1)]

Description will be given of a compound which is represented by General Formula (1) below.

General Formula (1)

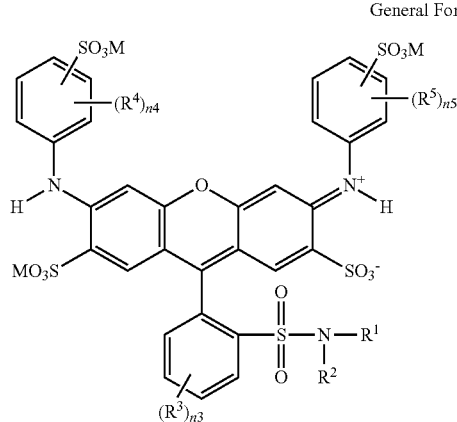

In General Formula (1), $R^1$ and $R^2$ each independently represent a hydrogen atom, a substituted or unsubstituted alkyl group, a substituted or unsubstituted aryl group, or a substituted or unsubstituted heterocyclic group, and $R^3$, $R^4$, and $R^5$ each independently represent a substituent group. M represents a hydrogen atom or a counter cation. Each of M may be the same or different. n3, n4, and n5 each independently represent a number between 0 and 4. A plurality of $R^1$, $R^4$, and $R^5$ may be the same or different in a case where n3, n4, and n5 each represent a number equal to or greater than 2.

$R^1$ and $R^2$ each independently represent a hydrogen atom, a substituted or unsubstituted alkyl group, a substituted or unsubstituted aryl group, or a substituted or unsubstituted heterocyclic group, preferably a hydrogen atom, a substituted or unsubstituted alkyl group, or a substituted or unsubstituted aryl group, and more preferably a hydrogen atom or a substituted or unsubstituted alkyl group.

In a case where $R^1$ and $R^2$ represent an alkyl group, an alkyl group with 1 to 10 carbon atoms is preferable, an alkyl group with 1 to 8 carbon atoms is more preferable, and an alkyl group with 3 to 8 carbon atoms is even more preferable. Examples of a straight-chain alkyl group include a methyl group, an ethyl group, a propyl group, a butyl group, a pentyl group, a hexyl group, a heptyl group, an octyl group, a nonyl group, a decyl group, and the like, and a propyl group, a butyl group, a pentyl group, a hexyl group, a heptyl group, and an octyl group are preferable.

At least one of $R^1$ and $R^2$ preferably represent a secondary alkyl group or a tertiary alkyl group, and more preferably represent a tertiary alkyl group.

Here, the "secondary alkyl group" described above refers to an alkyl group where a carbon atom which is bonded with a nitrogen atom is a secondary carbon atom which is bonded with two carbon atoms, and the "tertiary alkyl group" described above refers to an alkyl group where a carbon atom which is bonded with a nitrogen atom is a tertiary carbon atom which is bonded with three carbon atoms.

Examples of the secondary alkyl group and the tertiary alkyl group described above include a branched or cyclic alkyl group and examples of the secondary alkyl group include an isopropyl group, a sec-butyl group, a 1-ethylpropyl group, a 1-methylisobutyl group, a 1-methylisopentyl group, a 1-methyloctyl group, a 1-ethyl-3-methylbutyl group, and the like, an isopropyl group and a sec-butyl group are preferable, and a sec-butyl group is more preferable.

Examples of a branched tertiary alkyl group include a tert-butyl group, a tert-pentyl group, a 1,1-dimethylbutyl group, a 1,1-dimethylpentyl group, a 1,1-dimethylhexyl group, a 1,1-dimethylheptyl group, a 1,1-dimethyloctyl group, a 1-ethyl-1-methylpropyl group, a 1,1,3,3-tetramethylbutyl group, and the like, and a tort-butyl group, a tert-pentyl group, and a 1,1,3,3-tetramethylbutyl group are preferable, and a tert-butyl group and a 1,1,3,3-tetramethylbutyl group are more preferable.

Examples of a cyclic secondary alkyl group include a cyclopropyl group, a cyclobutyl group, a cyclopentyl group, a cyclohexyl group, a cycloheptyl group, a cyclooctyl group, and the like, and a cyclopentyl group and a cyclohexyl group are preferable, and a cyclohexyl group is more preferable.

Examples of a cyclic tertiary alkyl group include an adamantyl group, a norbornane group, a tetracyclododecanyl group, a tricyclodecanyl group, a diamantyl group, and the like, and an adamantyl group is preferable.

The details of the reasons why the printing density is excellent and it is possible to improve light fastness when $R^1$ and $R^2$ are a secondary alkyl group or a tertiary alkyl group are not clear; however, the following is assumed. That is, a sulfamoyl group which includes $R^1$ and $R^2$ is bulky when $R^1$ and $R^2$ is a secondary alkyl group or a tertiary alkyl group. It is assumed that, as a result of the above, steric hindrance occurs and the excited state (for example, forming an excited dimer) which is the starting point of photodecomposition is eased by the intermolecular interaction between the compounds which are represented by General Formula (1) being suppressed by the repellence due to the bulky substituent group. In addition, in a case where one of $R^1$ or $R^2$ of the compound which is represented by General Formula (1) is a hydrogen atom, as shown in the equilibrium reaction formula below, a colorless closed ring body which is an isomer is present; however, it is assumed that generation of the colorless closed ring body is suppressed by the steric hindrance of $R^1$. Here, $R^1$, $R^3$, $R^4$, $R^5$, M, $n^3$, $n^4$, and $n^5$ in the equilibrium reaction formula below are the same as $R^1$, $R^3$, $R^4$, $R^5$, M, $n^3$, $n^4$, and $n^5$ in General Formula (1).

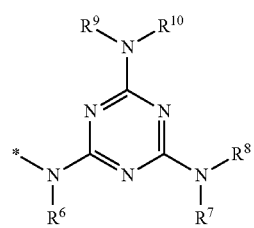

General Formula (2)

In General Formula (2), $R^6$, $R^7$, $R^8$, $R^9$, and $R^{10}$ each independently represent a hydrogen atom, a substituted or unsubstituted alkyl group, or a substituted or unsubstituted aryl group. * represents an atomic bond.

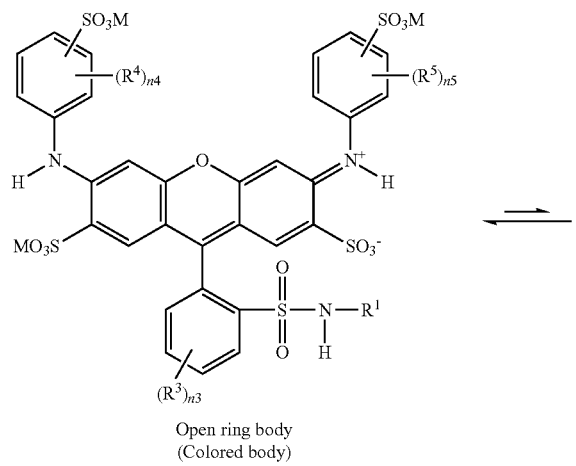

Open ring body
(Colored body)

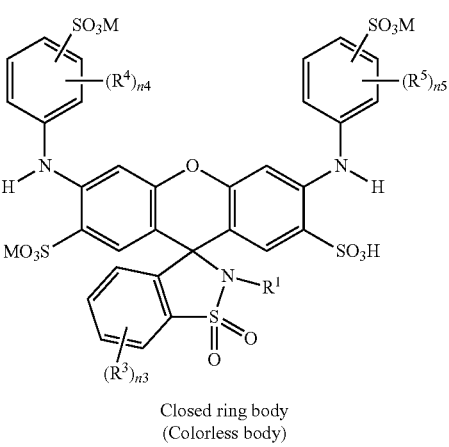

Closed ring body
(Colorless body)

In a case where $R^1$ and $R^2$ represent an aryl group, an aryl group with 6 to 14 carbon atoms is preferable, an aryl group with 6 to 10 carbon atoms is more preferable, and an aryl group with 6 carbon atoms is even more preferable. The aryl group described above is preferably a phenyl group, or a naphthyl group, and more preferably a phenyl group.

In a case where $R^1$ and $R^2$ represent a heterocyclic group, a heterocyclic group with 5 to 10 carbon atoms is preferable, a heterocyclic group with 5 to 8 carbon atoms is more preferable, and a heterocyclic group with 5 or 6 carbon atoms is even more preferable. The heterocyclic group described above is preferably a piperidyl group, a tetrahydrofuryl group, a thienyl group, a furyl group, or a pyridyl group, and more preferably a 4-piperidyl group.

In a case where $R^1$ and $R^2$ represent an alkyl group, an aryl group, or a heterocyclic group, these may be further substituted with a substituent group. Examples of the further substituent group described above include a substituent group which is selected from the substituent group A described above and an alkyl group, an aryl group, an amino group, a hydroxyl group, a halogen atom, an ionic hydrophilic group, and a substituent group which is represented by Formula (2) below are preferable, and these may be further substituted.

In a case where $R^6$, $R^7$, $R^8$, $R^9$, and $R^{10}$ represent an alkyl group, an alkyl group with 1 to 10 carbon atoms is preferable, and an alkyl group with 1 to 6 carbon atoms is more preferable.

In a case where $R^6$, $R^7$, $R^8$, $R^9$, and $R^{10}$ represent an aryl group, an aryl group with 6 to 10 carbon atoms is preferable, and an aryl group with 6 carbon atoms is more preferable.

In a case where $R^6$, $R^7$, $R^8$, $R^9$, and $R^{10}$ represent an alkyl group or an aryl group, these may have a substituent group and examples of the substituent group include a hydroxyl group, a carboxyl group, a sulfo group, and the like.

From the point of view of light fastness, it is preferable that one of $R^1$ and $R^2$ is a hydrogen atom and that the other is a substituent group.

Examples of the substituent group represented by $R^3$, $R^4$, and $R^5$ include a substituent group which is selected from the substituent group A described above and, from the point of view of the availability of raw materials and case of synthesis, a halogen atom, an aryl group, an alkoxy group, an alkyl group, an acyl amino group, an alkyl or aryl sulfonyl amino group, an alkyl or aryl ureide group are preferable, an alkyl group and an acyl amino group are more preferable, and an alkyl group is even more preferable.

In a case where $R^3$, $R^4$, and $R^5$ represent an alkyl group, from the point of view of the availability of raw materials, an alkyl group with 1 to 6 carbon atoms is preferable, and an alkyl group with 1 to 3 carbon atoms is more preferable. In addition, an alkyl group with a straight-chain or branched structure is preferable. Specific examples of the alkyl group described above include a methyl group, an ethyl group, an n-propyl group, an i-propyl group, a t-butyl group, and the like, and a methyl group, an ethyl group, or an i-propyl group is preferable, a methyl group or an ethyl group is more preferable, and a methyl group is even more preferable.

The alkyl groups described above may have a substituent group and examples of the substituent group include a halogen atom, a hydroxyl group, and the like.

The alkyl groups described above are preferably unsubstituted alkyl groups.

In a case where $R^3$, $R^4$, and $R^5$ represent an acyl amino group, from the point of view of the availability of raw materials and printing density, the acyl group in the acyl amino group is preferably an aliphatic acyl group and more preferably an aliphatic acyl group with 2 to 6 carbon atoms. Specific examples thereof include an acetyl amino group, a propionyl amino group, a butyryl amino group, an isobutyryl amino group, a pivaloyl amino group, a cyclohexanoyl amino group, and the like, and an isobutyryl amino group is particularly preferable.

The acyl amino group described above is preferably a monoacyl amino group.

In a case where $R^3$, $R^4$, and $R^5$ represent an alkyl or aryl sulfonyl amino group, from the point of view of the availability of raw materials, a mesyl amino group, a benzene sulfonyl amino group, and a p-tosyl amino group are preferable, a mesyl amino group and a p-tosyl amino group are more preferable, and a mesyl amino group is particularly preferable.

In a case where $R^3$, $R^4$, and $R^5$ represent an alkyl or aryl ureide group, from the point of view of the availability of raw materials, an alkyl ureide group with 1 to 6 carbon atoms and a phenyl ureide group are preferable, and an isopropyl ureide group is particularly preferable.

$R^4$ and $R^5$ are preferably substituted at an ortho position and/or a para position with respect to a nitrogen atom and, for —$SO_3M$ in a phenyl group which has $R^4$ and $R^5$, preferably substituted at a meta position or a para position with respect to a nitrogen atom.

n3 represents a number between 0 and 4. From the point of view of the availability of raw materials, n3 is preferably a number between 0 and 3, more preferably a number between 0 and 2, even more preferably 0 or 1, and particularly preferably 0.

n4 and n5 each independently represent a number between 0 and 4. From the point of view of the availability of raw materials and ease of synthesis, n4 and n5 are preferably a number between 1 and 4, more preferably a number between 2 and 4, even more preferably 2 or 3, and particularly preferably 3.

A plurality of $R^3$, $R^4$, and $R^5$ may be the same or different in a case where n3, n4, and n5 represent a number equal to or greater than 2.

In General Formula (1) described above, M represents a hydrogen atom or a counter cation. Each of M may be the same or different.

In General Formula (1) described above, in a case where M is a hydrogen atom, M takes the form of a free acid. In a case where M is a counter cation, M takes the form of a salt.

Examples of counter cations which form a salt include monovalent counter cations, and alkali metal ions, ammonium ions, organic cations, and the like are preferable.

Examples of organic cations include tetramethyl ammonium ions, tetramethyl guanidium ions, tetramethyl phosphonium, and the like.

From the point of view of the availability of raw materials, water solubility of the dye, and suppression of the generation of glossiness at the time of creating a secondary color with another dye in the case of use as an inkjet ink, alkali metal ions are preferable, and lithium ions, sodium ions, and potassium ions are more preferable. In particular, sodium ions are inexpensive and therefore preferable.

In the present invention, from the point of view of ease of synthesis (ease of handling as dye powder), the compound which is represented by General Formula (1) described above is preferably in the form of a salt, more preferably lithium salt, sodium salt, or potassium salt, and even more preferably sodium salt.

In General Formula (1) described above, each M may be the same or different. That is, that the compound which is represented by General Formula (1) described above is in the form of a salt includes a case where all the sulfo groups are salts and a case where some of the sulfo groups take the form of a free acid and some sulfo groups are salts. In addition, the counter cations which form salts may be one type or a plurality of types.

In the present invention, from the point of view of ease of synthesis (case of handling as dye powder), the compound which is represented by General Formula (1) described above is preferably in the form of a salt and a case where all the sulfo groups are salts is more preferable.

Specific examples of the compound which is represented by General Formula (1) will be given below; however, the present invention is not limited thereto. Here, in the specific examples described below, Me represents a methyl group.

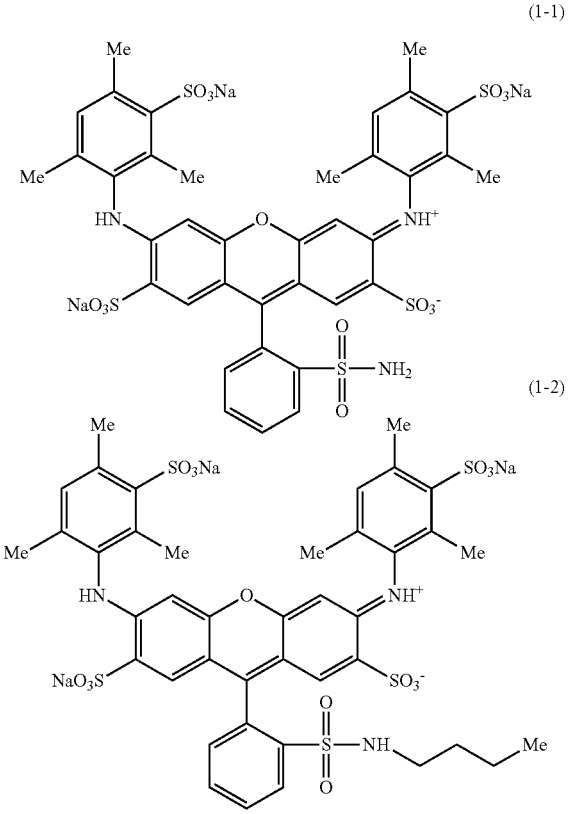

(1-3)
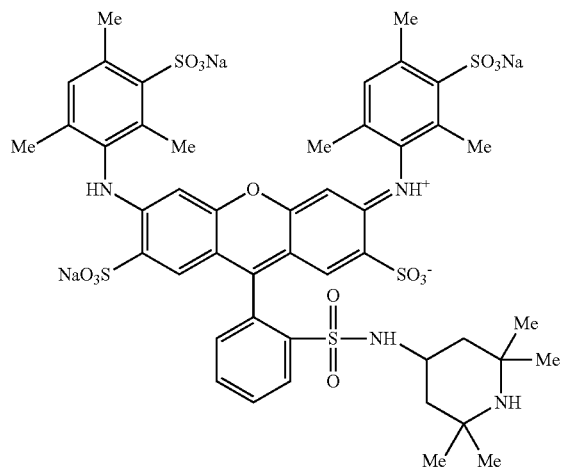
(1-4)
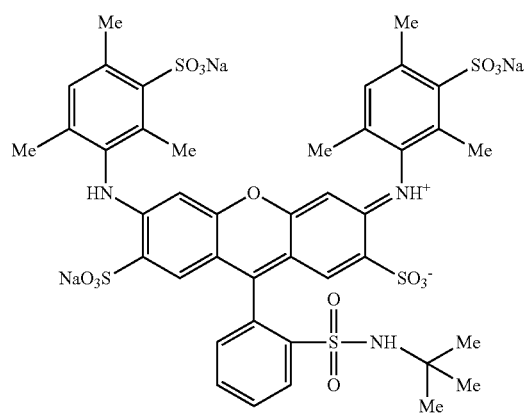
(1-5)
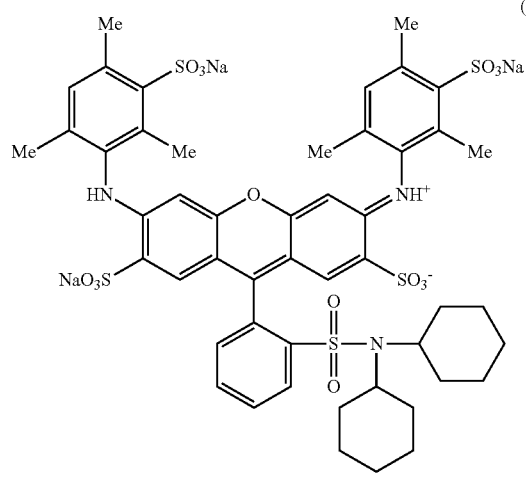
(1-6)
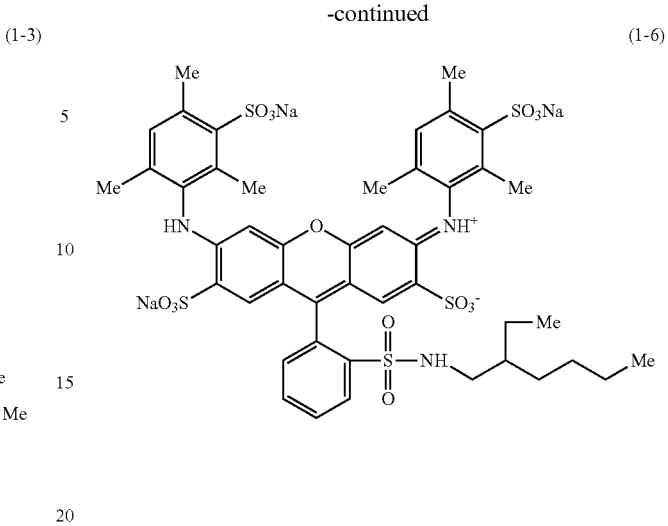
(1-7)
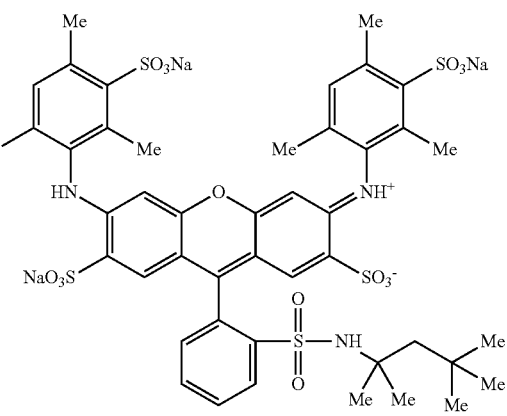
(1-8)
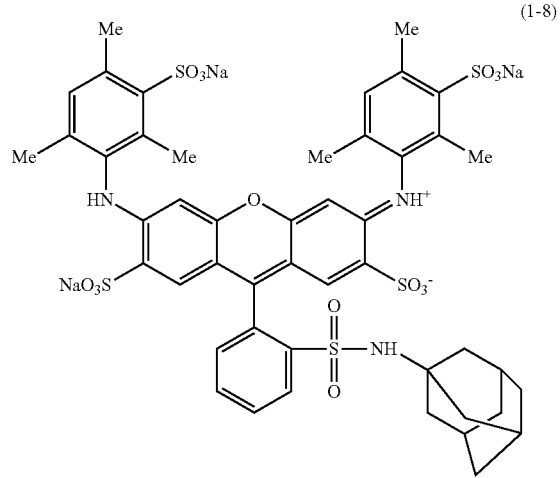

(1-9)

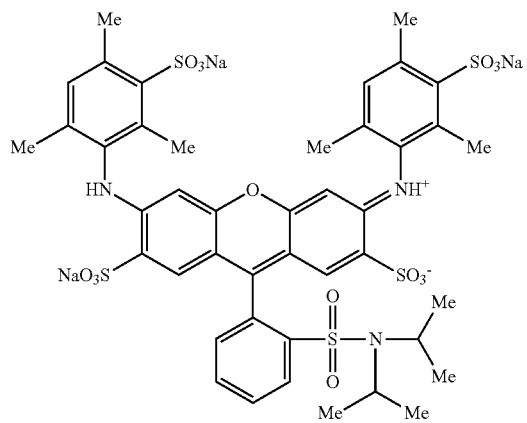

(1-10)

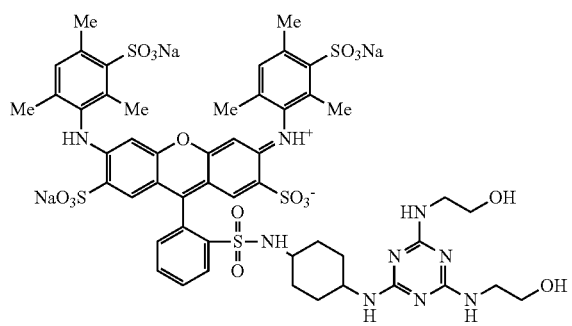

(1-11)

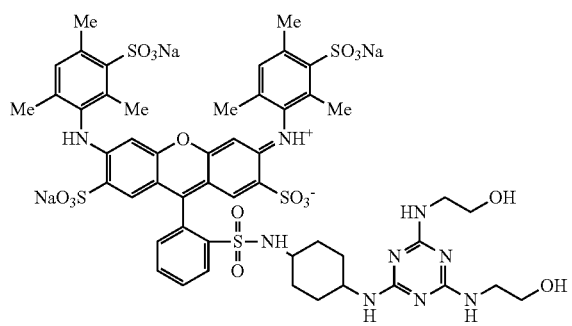

(1-12)

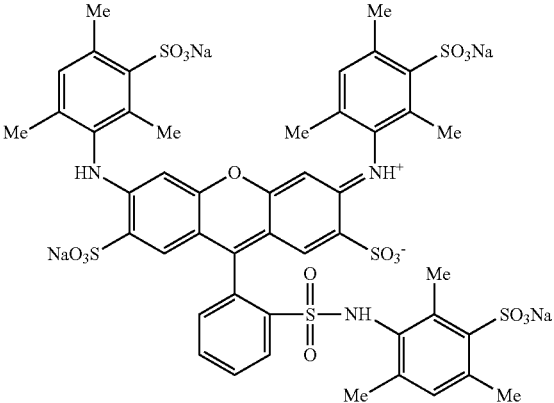

Next, description will be given of a method for synthesizing the compound which is represented by General Formula (1). It is possible to synthesize the compound which is represented by General Formula (1), for example, through the synthetic pathway described below. It is possible to obtain a compound which is represented by General Formula (e) by obtaining a compound which is represented by General Formula (c) by reacting a compound which is represented by General Formula (a) with a compound which is represented by General Formula (b) in the presence of a Lewis acid (for example, aluminum chloride and the like) and then reacting the obtained compound which is represented by General Formula (c) with a compound which is represented by General Formula (d) in the presence of a Lewis acid (for example, magnesium oxide, zinc chloride, or the like) (in a case where the compound which is represented by General Formula (b) and the compound which is represented by General Formula (d) are the same compound (that is, a case where $R^4=R^5$ and $n^4=n^5$), the compound which is represented by General Formula (e) is directly synthesized from General Formula (a) without synthesizing General Formula (c)). General Formula (h) is synthesized by further reacting the obtained General Formula (e) with a chlorinating agent (for example, phosphorus oxychloride, thionyl chloride, or the like), synthesizing the compound which is represented by General Formula (f), and reacting the synthesized compound with a compound which is represented by General Formula (g). Lastly, it is possible to obtain the compound which is represented by General Formula (1) by sulfonating the obtained General Formula (h) using a sulfonating agent (for example, fuming sulfuric acid or chlorosulfonic acid). Here, $R^1$, $R^2$, $R^3$, $R^4$, $R^5$, M, $n^3$, $n^4$, and $n^5$ in General Formula (a), General Formula (b), General Formula (c), General Formula (d), General Formula (e), General Formula (f), General Formula (g), and General Formula (h) are the same as $R^1$, $R^2$, $R^3$, $R^4$, $R^5$, M, $n^3$, $n^4$, and $n^5$ in General Formula (1) and the preferable examples thereof are also the same. In addition, X in General Formula (f) represents a chlorine atom. Specific examples are given in the Examples.

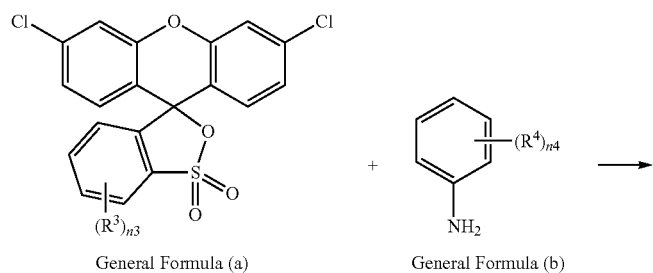
General Formula (a) + General Formula (b) →
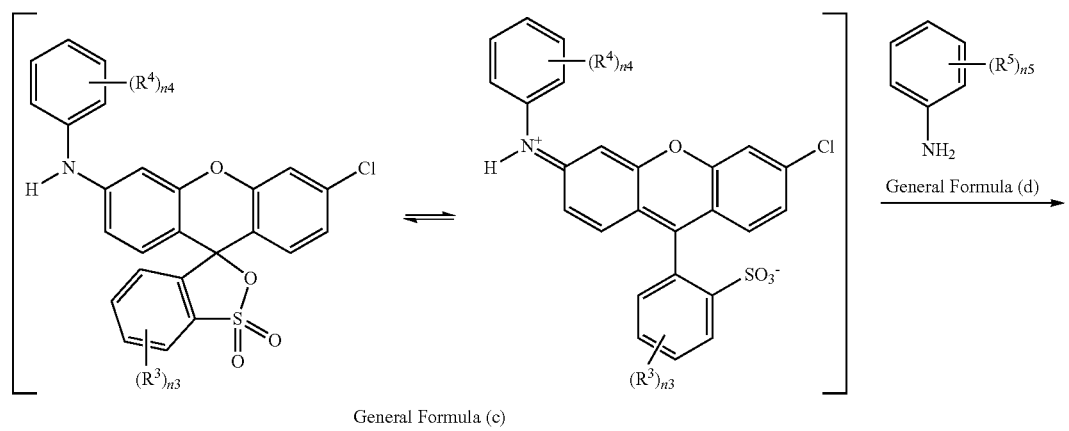
General Formula (c)     General Formula (d)
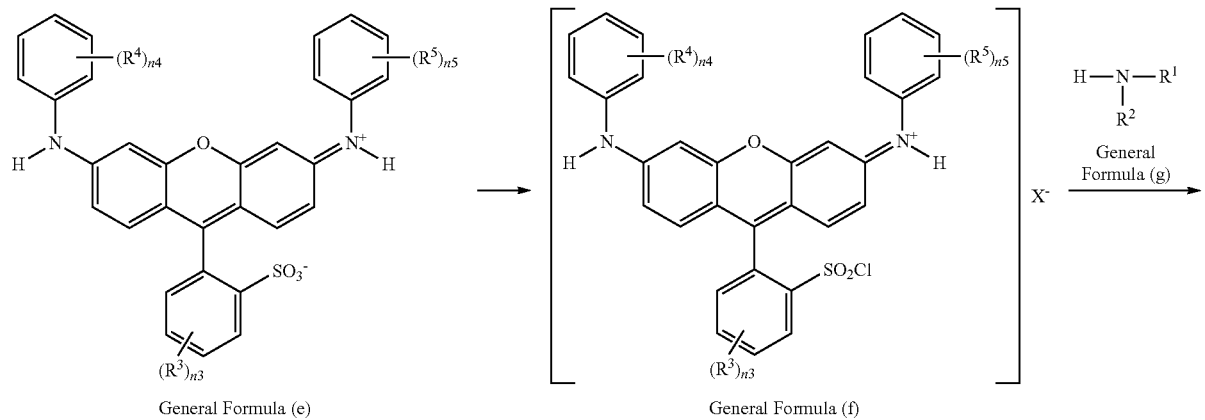
General Formula (e)     General Formula (f)     General Formula (g)
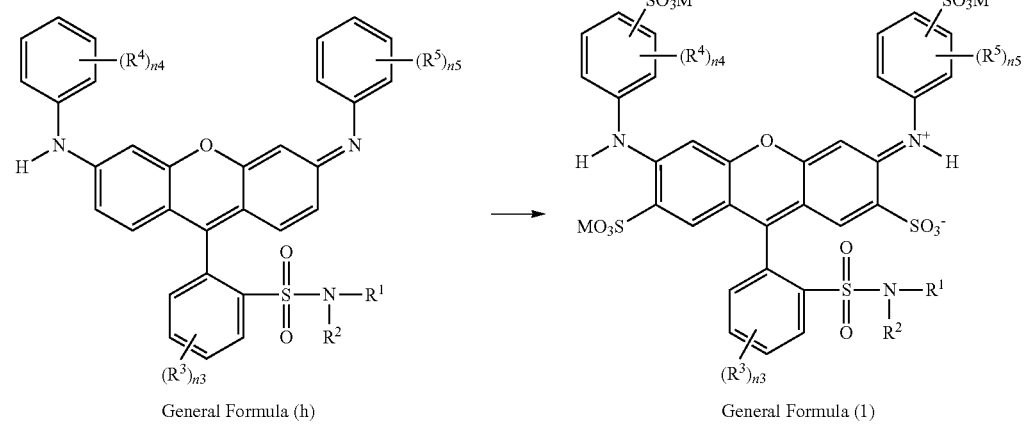
General Formula (h)     General Formula (1)

It is possible to obtain the compound which is represented by General Formula (a) by a method known in the art (for example, the method described in pages 19,588 to 19,591 in Journal of the American Chemical Society No. 48, Volume 134, 2012).

It is possible to obtain General Formula (b) and General Formula (d) as commercially available chemical reagents (for example, Tokyo Chemical Industry catalogue No. T0467 and the like) or by a method known in the art (for example, the methods described in DE2,412,578 (1974)) and the like.

It is possible to obtain General Formula (g) as commercially available chemical reagents (for example, Tokyo Chemical Industry catalogue No. T0143 and the like).

[Colorant Composition]

The colorant composition of the present invention contains at least one type of compound which is represented by General Formula (1) described above. The colorant composition of the present invention is able to contain a medium; however, in a case of using a solvent as a medium, the colorant composition is particularly favorable as an ink for inkjet recording. It is possible to produce the colorant composition of the present invention by using a lipophilic medium or water-based medium as the medium and dissolving and/or dispersing the compound which is represented by General Formula (1) described above therein. A water-based medium is preferably used. The colorant composition of the present invention also includes ink compositions from which the medium is removed.

In the present invention, the content of the compounds of the present invention which are included in the colorant composition is determined according to the type of substituent group to be used in General Formula (1), the type of solvent components which are used for producing the colorant composition, and the like; however, the content of the compounds which are represented by General Formula (1) in the colorant composition with respect to the total mass of the colorant composition is preferably 1 mass % to 20 mass %, more preferably 1 mass % to 10 mass %, and even more preferably 2 mass % to 6 mass %.

By setting the content of the compounds which are represented by General Formula (1) which are included in the colorant composition to 1 mass % or more, it is possible to make the printing density of ink on a recording medium when printing favorable and it is possible to secure the necessary image density. In addition, by setting the total amount of the compounds which are represented by General Formula (1) which are included in the colorant composition to 10 mass % or less, it is possible to make the ejection property of the colorant composition favorable in a case of being used for an inkjet recording method and, moreover, effects such as inkjet nozzles being not easily clogged are obtained.

The colorant composition of the present invention may contain other additive agents as necessary in a range which does not impair the effects of the present invention. Examples of other additive agents include additive agents which may be used for the ink for inkjet recording which will be described below.

[Ink for Inkjet Recording]

Next, description will be given of the ink for inkjet recording of the present invention.

The ink for inkjet recording of the present invention contains the colorant composition of the present invention.

It is possible to produce the ink for inkjet recording by dissolving and/or dispersing the compounds which are represented by General Formula (1) described above in a lipophilic medium or water-based medium. Ink which uses a water-based medium is preferable.

It is possible to contain other additive agents as necessary in a range which does not impair the effects of the present invention. Examples of other additive agents include additive agents known in the art such as drying inhibitors (wetting agents), fading inhibitors, emulsion stabilizers, permeation promoting agents, ultraviolet absorbers, preservative agents, antifungal agents, pH adjusting agents, surface tension adjusting agents, antifoaming agents, viscosity adjusting agents, dispersing agents, dispersion stabilizers, rust preventing agents, and chelating agents. The various types of the additive agents are directly added to an ink liquid in a case of a water-soluble ink. In a case of using an oil soluble dye in a form of a dispersoid, the additive agents are generally added to the dispersoid after preparing the dye dispersoid; however, the additive agents may also be added to the oil phase or water phase during preparation.

Drying inhibitors are favorably used for the purpose of preventing clogging caused by the ink for inkjet recording described above drying in the ink ejection port of a nozzle which is used for an inkjet recording method.

The drying inhibitor is preferably a water-soluble organic solvent which has lower vapor pressure than water. Specific examples include polyhydric alcohols which are represented by ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerine, and trimethylolpropane, lower alkyl ethers of polyhydric alcohols such as ethylene glycol monomethyl (or ethyl) ether, diethylene glycol monomethyl (or ethyl) ether, and triethylene glycol monoethyl (or butyl) ether, heterocyclic compounds such as 2-pyrrolidone, N-methyl-2-pyrrolidone, 1,3-dimethyl-2-imidazolidinone, and N-ethylmorpholine, sulfur containing compounds such as sulfolane, dimethyl sulfoxide, and 3-sulfolene, polyfunctional compounds such as diacetone alcohol and diethanol amine, and urea derivatives. Among these, polyhydric alcohols such as glycerine and diethylene glycol are more preferable. In addition, the drying inhibitors described above may be used individually or two or more types may be used together. The drying inhibitors are preferably contained in the ink at 10 mass % to 50 mass %.

Permeation promoting agents are favorably used for the purpose of improving the permeation of the ink for inkjet recording into paper. As the permeation promoting agent, it is possible to use alcohols such as ethanol, isopropanol, butanol, di(tri)ethylene glycol monobutyl ether, and 1,2-hexanediol, sodium lauryl sulfate, sodium oleate, non-ionic surfactants, and the like. When the above are contained in the ink at 5 mass % to 30 mass %, the effects thereof are generally sufficiently exhibited and the above are preferably added and used in amounts in ranges which do not cause printing bleeding and paper through (print through).

Ultraviolet absorbers are used for the purpose of improving the storage property of an image. As the ultraviolet absorbers, it is also possible to use the benzotriazole-based compounds which are described in JP1983-185677A (JP-S58-185677A), JP1986-190537A (JP-S61-190537A), JP1990-782A (JP-H2-782A), JP1993-197075A (JP-H5-197075A), JP1997-34057A (JP-H9-34057A), and the like, the benzophenone-based compounds which are described in JP1971-2784A (JP-S46-2784A), JP1993-194483A (JP-H5-194483A), U.S. Pat. No. 3,214,463A, and the like, the cinnamic acid-based compounds which are described in JP1973-30492B (JP-S48-30492B), JP1981-21141B (JP-S56-21141B), JP1998-88106A (JP-H10-88106A), and the like, the triazine-based compounds which are described in JP1992-298503A (JP-H4-298503A), JP1996-53427A (JP-H8-53427A), JP1996-239368A (JP-H8-238368A), JP1998-182621A (JP-H10-182621A), JP1996-501291A (JP-H8-501291A), and the like, the compounds which are described in Research Disclosure No. 24239, or compounds which absorb ultraviolet rays and emit fluorescent light represented by stilbene-based compounds and benzoxazol-based compounds, that is, so-called fluorescent brightening agents.

Fading inhibitors are used for the purpose of improving the storage property of an image. As the fading inhibitor described above, it is possible to use various types of organic-based and metal complex-based fading inhibitors. Examples of organic fading inhibitors include hydroquinones, alkoxyphenols, dialkoxyphenols, phenols, anilines, amines, indans, chromans, alkoxyanilines, hetero rings, and the like, and examples of metal complexes include nickel complexes, zinc complexes, and the like. In more detail, it is possible to use the compounds which are described in the patents which are cited in sections 1 to J in No. VII in Research Disclosure No. 17643, Research Disclosure No. 15162, the left column in page 650 in Research Disclosure No. 18716, page 527 in Research Disclosure No. 36544, page 872 in Research Disclosure No. 307105, and Research Disclosure No. 15162 or the compounds which are included in the General Formulas and compound examples of representative compounds which are described in page 127 to page 137 in JP1987-215272A (JP-S62-215272A).

Examples of antifungal agents include sodium dehydroacetate, sodium benzoate, sodium pyridinethione-1-oxide, ethyl p-hydroxybenzoate ester, 1,2-benzisothiazolin-3-one, salts thereof and the like. The above are preferably used at 0.02 mass % to 1.00 mass % in the ink.

It is possible to use the neutralizers (organic salt groups and inorganic alkalis) described above as the pH adjusting agent. For the purpose of improving the storage stability of the ink for inkjet recording, the pH adjusting agent described above is preferably added such that the ink for inkjet recording described above has a pH of 6 to 10 and more preferably added such that the pH is 7 to 10.

Examples of surface tension adjusting agents include nonion, cation, or anion surfactants. Here, the surface tension of the ink for inkjet recording of the present invention is preferably 25 mN/m to 70 mN/m. 25 mN/m to 60 mN/m is more preferable. In addition, the viscosity of the ink for inkjet recording of the present invention is preferably 30 mPa·s or less. Furthermore, it is more preferable to adjust the viscosity to 20 mPa·s or less. Examples of surfactants are preferably anion-based surfactants such as fatty acid salts, alkyl sulfuric acid ester salts, alkyl benzene sulfonic acid salts, alkyl naphthalene sulfonic acid salts, dialkyl sulfosuccinate acid salts, alkyl phosphoric acid ester salts, naphthalene sulfonic acid formalin condensates, and polyoxyethylene alkyl sulfuric acid ester salts, or nonion-based surfactants such as polyoxyethylene alkyl ethers, polyoxyethylene alkylallyl ethers, polyoxyethylene fatty acid esters, sorbitan fatty acid esters, polyoxyethylene sorbitan fatty acid esters, polyoxyethylene alkylamines, glycerine fatty acid esters, and oxyethyleneoxypropylene block copolymers. In addition, Surfynols (produced by Air Products and Chemicals, Inc.), which are acetylene-based polyoxyethylene oxide surfactants, are also preferably used. In addition, amine oxide-type amphoteric surfactants and the like such as N,N-dimethyl-N-alkylamine oxide are also preferable. Furthermore, it is also possible to use the examples of surfactants which are described in page 37 to page 38 in JP1984-157636A (JP-S59-157636A) and Research Disclosure No. 308119 (in 1989).

As the antifoaming agents, it is also possible to use chelating agents and the like represented by fluorine-based or silicone-based compounds or EDTA as necessary.

In a case of dispersing the compounds of the present invention in a water-based medium, fine coloring particles which contain compounds and oil soluble polymers are preferably dispersed in a water-based medium as described in each of JP1999-286637A (JP-H11-286637A), JP2000-78491, JP2000-80259, JP2000-62370, and the like or the compounds of the present invention which are dissolved in organic solvents with a high boiling points are preferably dispersed in a water-based medium as described in each of the specifications of JP2000-78454, JP2000-78491, JP2000-203856, and JP2000-203857. Regarding specific methods, oil soluble polymers to be used, organic solvents with high boiling point, additive agents, and the usage amounts thereof in a case of dispersing the compounds of the present invention in a water-based medium, it is possible to preferably use those described in the patent specifications described above. Alternatively, the compound of the present invention described above may be dispersed in a fine particle state as a solid. During the dispersing, it is possible to use a dispersing agent or a surfactant. As a dispersing apparatus, it is possible to use a simple stirrer, an impeller stirring method, an inline stirring method, a mill method (for example, a colloid mill, a ball mill, a sand mill, an attritor, a roll mill, an agitator mill, or the like), an ultrasonic wave method, a high-pressure emulsifying and dispersing system (a high-pressure homogenizer; examples of specific commercially available apparatuses include a Gorlin homogenizer, a microfluidizer, DeBEE 2000, and the like). Regarding the methods for preparing the ink for inkjet recording described above, other than the patents described above, details are described in each of JP1993-148436A (JP-H5-148436A), JP1993-295312A (JP-H5-295312A), JP1995-97541A (JP-H7-97541A), JP1995-82515A (JP-H7-82515A), JP1995-118584A (JP-H7-118584A), JP1999-286637A (JP-H11-286637A), and JP2000-87539 and it is also possible to use the above to prepare the ink for inkjet recording of the present invention.

The water-based medium has water as the main component and it is possible to use a mixture to which a water-miscible organic solvent is added as desired. Examples of the water-miscible organic solvent described above include alcohol (for example, methanol, ethanol, propanol, isopropanol, butanol, isobutanol, sec-butanol, t-butanol, pentanol, hexanol, cyclohexanol, and benzyl alcohol), polyhydric alcohols (for example, ethylene glycol, diethylene glycol, triethylene glycol, polyethylene glycol, propylene glycol, dipropylene glycol, polypropylene glycol, butylene glycol, hexanediol, pentanediol, glycerine, hexanetriol, and thiodiglycol), glycol derivatives (for example, ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, and ethylene glycol monophenyl ether), amine (for example, ethanol amine, diethanol amine, triethanol amine, N-methyl diethanol amine, N-ethyl diethanol amine, morpholine, N-ethyl morpholine, ethylene diamine, diethylene triamine, triethylene tetramine, polyethyleneimine, and tetramethyl propylene diamine), and other polar solvents (for example, formamide, N,N-dimethyl formamide, N,N-dimethyl acetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, and acetone). Here, two or more types of the water-miscible organic solvent with described above may be used together.

In 100 parts by mass of the ink for inkjet recording of the present invention, the compounds which are represented by General Formula (1) described above are preferably contained at 0.2 parts by mass or more to 10 parts by mass or less, and more preferably contained at 1 part by mass or more to 6 parts by mass or less. In addition, other pigments may be used together with the compounds which are represented by General Formula (1) described above in the ink for inkjet recording of the present invention. In a case of using two or more types of pigments, the total content of the pigments is preferably in the ranges described above.

The viscosity of the ink for inkjet recording of the present invention is preferably 30 mPa-s or less. In addition, the surface tension thereof is preferably 25 mN/m or more to 70 mN/m or less. It is possible to adjust the viscosity and the surface tension by adding various additive agents, for example, viscosity adjusting agents, surface tension adjusting agents, specific resistance adjusting agents, coating film adjusting agents, ultraviolet absorbers, antioxidants, fading inhibitors, antifungal agents, rust preventing agents, dispersing agents, and surfactants.

It is possible to use the ink for inkjet recording of the present invention not only to form single color images, but also to form full color images. It is possible to use magenta tone ink, cyan tone ink, and yellow tone ink in order to form a full color image and, moreover, black tone ink may be further used in order to adjust the tone.

It is possible to use arbitrary dyes as applicable yellow dyes. Examples thereof include aryl or heterylazo dye which has phenols, naphthols, anilines, hetero rings such as pyrazolone and pyridone, open chain type active methylene compounds, or the like as coupling components (referred to below as coupler components); azomethine dyes which have open chain type active methylene compounds or the like as coupler components; methine dyes such as benzylidene dyes and monomethine oxonol dyes; quinone-based dyes such as naphthoquinone dyes and anthraquinone dyes; and the like, and examples of types of dye other than the above include quinophthalone dyes, nitro and nitroso dyes, acridine dyes, acridinone dyes, and the like.

It is possible to use arbitrary dyes as applicable magenta dyes. Examples thereof include aryl or heterylazo dyes which have phenols, naphthols, anilines, or the like as coupler components; azomethine dyes which have pyrazolones, pyrazolo triazols, or the like as coupler components; methine dyes such as arylidene dyes, styryl dyes, merocyanine dyes, cyanine dyes, and oxonol dyes; carbonium dyes such as diphenyl methane dyes, triphenyl methane dyes, and xanthene dyes; quinone dyes such as naphthoquinone, anthraquinone, and anthrapyridone; condensed polycyclic dyes such as dioxazine, and the like.

It is possible to use arbitrary dyes as applicable cyan dyes. Examples thereof include aryl or heterylazo dyes which have phenols, naphthols, anilines, or the like as coupler components; azomethine dyes which have phenols, naphthols, hetero rings such as pyrrolotriazole, or the like as coupler components; polymethine dyes such as cyanine dyes, oxonol dyes, and merocyanine dyes; carbonium dyes such as diphenyl methane dyes, triphenyl methane dyes, and xanthene dyes; phthalocyanine dyes; anthraquinone dyes; indigo thioindigo dyes, and the like.

Each of the dyes described above may exhibit each color of yellow, magenta, and cyan only after a chromophore part is released, and the counter cation in this case may be an inorganic cation such as alkali metal or ammonium or may be an organic cation such as pyridinium or quaternary ammonium salts, and, moreover, may be a polymer cation which has the above in a part of the structure.

Examples of applicable black coloring materials other than disazo, triazo, and tetraazo dyes include a dispersion body of carbon black.

It is possible to use the ink composition of the present invention for a recording method such as printing, reproducing, marking, writing, drawing, or stamping and the ink composition of the present invention is particularly suitable for use in an inkjet recording method.

[Inkjet Recording Method]

The present invention also relates to an inkjet recording method which forms images using the colorant composition or the ink for inkjet recording of the present invention.

The inkjet recording method of the present invention supplies energy to the ink for inkjet recording described above to form images on an image receiving material known in the art, that is, plain paper or resin coated paper, for example, inkjet specialty paper, films, electrophotography paper, fabric, glass, metal, ceramics, and the like which are described in JP1996-169172A (JP-H8-169172A), JP1996-27693A (JP-H8-27693A), JP1990-276670A (JP-H2-276670A), JP1995-276789A (JP-H7-276789A), JP1997-323475A (JP-H9-323475A), JP1987-238783A (JP-S62-238783A), JP1998-153989A (JP-H10-153989A), JP1998-217473A (JP-H10-217473A), JP1998-235995A (JP-H10-235995A), JP1998-337947A (JP-H10-337947A), JP1998-217597A (JP-H10-217597A), JP1998-337947A (JP-H10-337947A), and the like.

When forming an image, a polymer fine particle dispersoid (also referred to as a polymer latex) may also be used therewith for the purpose of imparting glossiness or water resistance or improving the weather resistance. The time of application of the polymer latex to the image receiving material may be before, after, or at the same time as the time of application of the coloring agent, accordingly, the place where the adding is carried out may also be on the image receiving paper or in the ink, alternatively, the polymer latex may be used as a liquid of an individual polymer latex. In detail, it is possible to preferably use the methods which are described in each of the specifications of JP2000-363090, JP2000-315231, JP2000-354380, JP2000-343944, JP2000-268952, JP2000-299465, JP2000-297365, and the like.

[Inkjet Printer Cartridge and Inkjet Recording Material]

The ink for inkjet recording cartridge of the present invention is filled with the ink for inkjet recording of the present invention described above. In addition, the inkjet recording material of the present invention forms a color image on a target recording material using the ink for inkjet recording of the present invention described above.

Description will be given below of a recording paper and a recording film which are used for inkjet printing using the ink of the present invention.

The support body in the recording paper and the recording film is formed of a chemical pulp such as LBKP or NBKP, a mechanical pulp such as GP, PGW, RMP, TMP, CTMP, CMP, or COP, old paper pulp such as DIP, or the like, and it is possible to use supporting bodies produced by various types of apparatuses such as a Fourdrinier paper machine or a cylinder paper machine after mixing in additive agents such as pigments, binders, sizing agents, fixing agents, cation agents, and paper strengthening agents which are known in the art as necessary. The support body may be any synthetic paper or plastic film sheet other than the above supporting bodies and the thickness of the support body is desirably 10 µm to 250 µm and the basis weight is desirably 10 g/m$^2$ to 250 g/m$^2$.

An ink receiving layer and a back coat layer may be provided on the support body as is and the ink receiving layer and the back coat layer may be provided after size pressing or providing an anchor coat layer using starch, polyvinyl alcohol, or the like. Furthermore, a flattening process may be performed on the support body using a calendar apparatus such as a machine calendar, a TO calendar, or a soft calendar. In the present invention, a paper or a plastic film of which both surfaces are laminated using polyolefin (for example, polyethylene, polystyrene, polyethylene terephthalate, polybutene, and a copolymer thereof) are more preferably used as a support body.

A white pigment (for example, titanium oxide or zinc oxide) or a coloring dye (for example, cobalt blue, navy blue, or neodymium oxide) is preferably added into the polyolefin.

An ink receiving layer which is provided on the support body contains a pigment or a water-based binder. The pigment is preferably a white pigment and examples of the white pigment include white inorganic pigments such as calcium carbonate, kaolin, talc, clay, diatomaceous earth, amorphous synthetic silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, organic pigments such as styrene-based pigments, acryl-based pigments, urea resins, and melamine resins, and the like. The white pigment which is contained in the ink receiving layer is preferably a porous inorganic pigment, and amorphous synthetic silica and the like with a large pore area are particularly favorable. Regarding the amorphous synthetic silica, it is possible to use either of silicic acid which is obtained by a drying production method and hydrated silicic acid which is obtained by a wetting production method; however, it is particularly desirable to use hydrated silicic acid.

Examples of the water-based binder which is contained in the ink receiving layer include water-soluble polymers such as polyvinyl alcohol, silanol modified polyvinyl alcohol, starch, cationized starch, casein, gelatin, carboxymethyl cellulose, hydroxyethyl cellulose, polyvinylpyrrolidone, polyalkylene oxide, and polyalkylene oxide derivatives, water dispersible polymers such as styrene-butadiene latex and acryl emulsion, and the like. It is possible to use the water-based binder individually or as two or more types together. In the present invention, polyvinyl alcohol and silanol modified polyvinyl alcohol are particularly favorable among the above in terms of the attachment to the pigment and the peeling resistance of the ink receiving layer.

In addition to the pigments and water-based binding agents, the ink receiving layer is able to contain a mordant, a waterproofing agent, a light fastness improving agent, a surfactant, and other additive agents.

The mordant which is added in the ink receiving layer is preferably immobilized. A polymer mordant is preferably used for this purpose.

The polymer mordant is described in each of the documents of JP1973-28325A (JP-S48-28325A), JP1979-74430A (JP-S54-74430A), JP1979-124726A (JP-S54-124726A), JP1980-22766A (JP-S55-22766A), JP1980-142339A (JP-S55-142339A), JP1985-23850A (JP-S60-23850A), JP1985-23851A (JP-S60-23851A), JP1985-23852A (JP-S60-23852A), JP1985-23853A (JP-S60-23853A), JP1985-57836A (JP-S60-57836A), JP1985-60643A (JP-S60-60643A), JP1985-118834A (JP-S60-118834A), JP1985-122940A (JP-S60-122940A), JP1985-122941A (JP-S60-122941A), JP1985-122942A (JP-S60-122942A), JP1985-235134A (JP-S60-235134A), and JP1989-161236A (JP-H1-161236A) and each of the specifications of U.S. Pat. Nos. 2,484,430A, 2,548,564A, 3,148,061A, 3,309,690A, 4,115,124A, 4,124,386A, 4,193,800A, 4,273,853A, 4,282,305A, and 4,450,224A. An image receiving material which contains the polymer mordant which is described in pages 212 to 215 in JP1989-161236A (JP-H1-161236A) is particularly preferable. When the polymer mordant which is described in the document above is used, an image with excellent image quality is obtained and the light fastness of the image is improved.

Waterproofing agents are effective for making an image water resistant and the waterproofing agent is particularly desirably a cation resin. Examples of cation resins include polyamide polyamine epichlorohydrin, polyethyleneimine, polyaminesulfon, dimethyl diallyl ammonium chloride polymer, cation polyacrylamide, colloidal silica, and the like, and polyamide polyamine epichlorohydrin is particularly favorable among the cation resins. The content of the cation resins is preferably 1 mass % to 15 mass % with respect to the total solid content of the ink receiving layer and particularly preferably 3 mass % to 10 mass %.

Examples of light fastness improving agents include benzotriazol-based ultraviolet absorbers such as zinc sulfate, zinc oxide, a hindered amine-based antioxidant, and benzopbenone, and the like. Among these, zinc sulfate is particularly favorable.

The surfactant functions as a coating aiding agent, a peeling property improving agent, a slidability improving agent, or an antistatic agent. The surfactant is described in each of the documents of JP1987-173463A (JP-S62-173463A) and JP1987-183457A (JP-S62-183457A). An organic fluoro compound may be used instead of the surfactant. The organic fluoro compound is preferably hydrophobic. Examples of organic fluoro compounds include a fluorine-based surfactant, an oil-form fluorine-based compound (for example, fluorine oil), and a solid-form fluorine compound resin (for example, a tetrafluoroethylene resin). Organic fluoro compounds are described in each of the documents of JP1982-9053B (JP-S57-9053B) (columns 8 to 17), JP1986-20994A (JP-S61-20994A), and JP1987-135826A (JP-S62-135826A). Examples of other additive agents which are added to the ink receiving layer include pigment dispersing agents, viscosity thickening agents, antifoaming agents, dyes, fluorescent brightening agents, preservative agents, pH adjusting agents, mat agents, film curing agents, and the like. Here, the ink receiving layer may be one layer or two layers.

It is also possible to provide a back coat layer on the recording paper and recording film and examples of components which are able to be added to this layer include white pigments, water-based binders, and other components. Examples of the white pigments which are contained in the back coat layer include white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, amorphous synthetic silica, colloidal silica, colloidal alumina, pseudoboehmite, aluminum hydroxide, alumina, lithopone, zeolite, hydrated halloysite, magnesium carbonate, and magnesium hydroxide, organic pigments such as styrene-based plastic pigments, acryl-based plastic pigments, polyethylene, micro capsules, urea resins, and melamine resins, and the like.

Examples of the water-based binder which is contained in the back coat layer include water-soluble polymers such as styrene/maleic acid salt copolymers, styrene/acrylic acid salt copolymers, polyvinyl alcohol, silanol modified polyvinyl alcohol, starch, cationized starch, casein, gelatin, carboxymethyl cellulose, hydroxyethyl cellulose, and polyvinylpyrrolidone, water dispersible polymers such as styrene-butadiene latex and acryl emulsions, and the like. Examples of other components which are included in the back coat layer include antifoaming agents, foam suppressors, dyes, fluorescent brightening agents, preservative agents, waterproofing agents, and the like.

A polymer latex may be added to the constituent layers (including the back coat layer) of the inkjet recording paper and the recording film. The polymer latex is used for the purpose of improving the physical properties of the film such as size stabilization, curling prevention, adhesion prevention, and film cracking prevention. The polymer latex is described in each of the documents of JP1987-245258A (JP-S62-245258A), JP1987-136648A (JP-S62-136648A), and JP1987-110066A (JP-S62-110066A). When a polymer latex with a low glass transition temperature (40° C. or less) is added to a layer which includes a mordant, it is possible to prevent the layer from cracking or curling. In addition, even when a polymer latex with a high glass transition temperature is added to the back coat layer, it is possible to prevent curling.

The ink of the present invention are not limited to an inkjet recording method and may be used in the methods known in the art, for example, a charge control method in which ink is ejected using electrostatic attraction, a drop on demand method (a pressure pulse method) using the vibration pressure of piezo elements, an acoustic inkjet method which changes an electric signal to acoustic beams, irradiates the ink with the acoustic beams, and ejects the ink using the radiation pressure, a thermal inkjet method for heating ink to form air bubbles and using the generated pressure, and the like. Inkjet recording methods include a method which discharges a number of low density inks referred to as photo inks at a small volume, a method which improves image quality using a plurality of inks with substantially the same color phases and different densities, and a method which uses colorless transparent inks.

EXAMPLES

Detailed description will be given below using Examples; however, the present invention is not limited to the Examples. Unless otherwise stated, "%" and "parts" in the Examples are mass % and parts by mass.

Synthesis Example 1

Synthesis of Exemplary Compounds (1-7)

The exemplary compounds (1-7) were synthesized according to the scheme below.

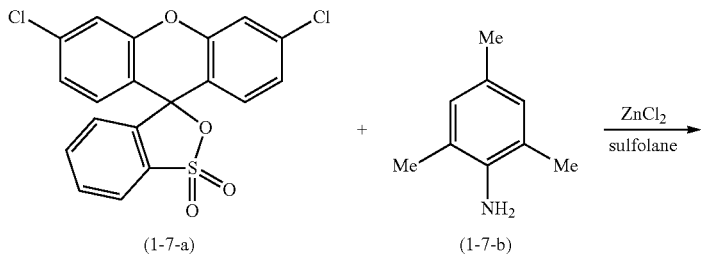

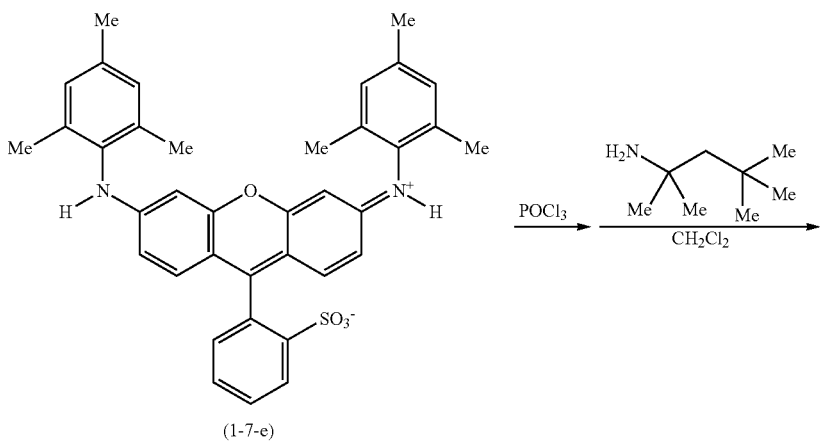

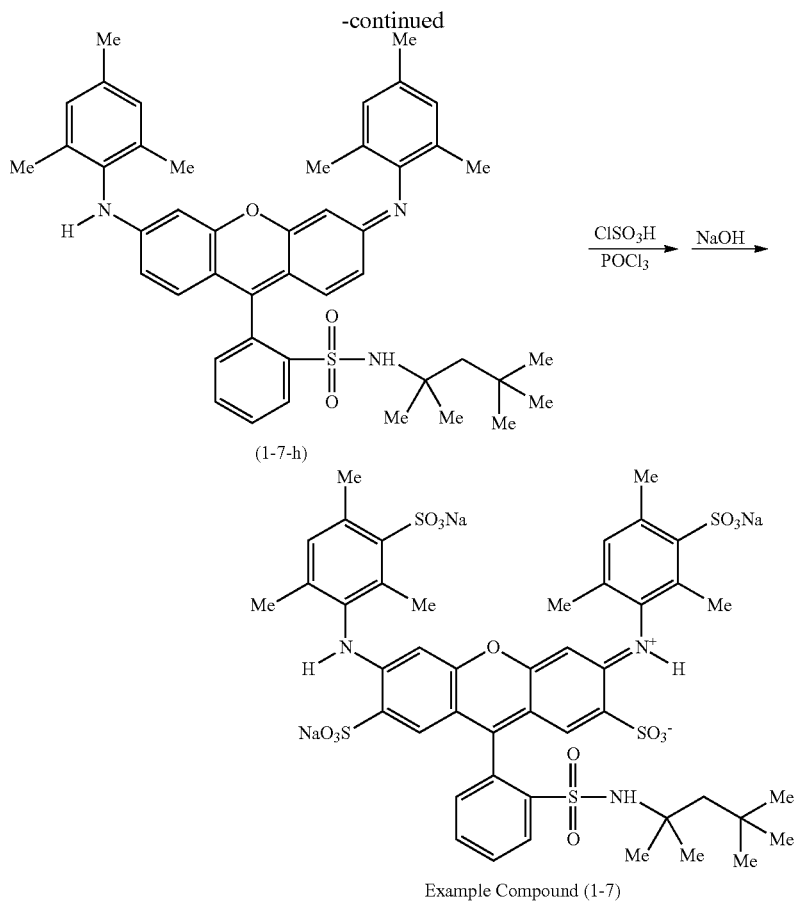

Example Compound (1-7)

Synthesis of Intermediate Body (1-7-e)

74.1 g of dichlorosulfophthalein (1-7-a) (content ratio 70%, DCSF produced by Chugai Kasei Co., Ltd., product name), 80.0 g of 2,4,6-trimethylaniline (produced by Tokyo Chemical Industry Co., Ltd.), and 28.6 g of zinc chloride were reacted in 320 g of sulfolane at 200° C. for 3 hours. The reaction liquid was left to cool down to room temperature and poured into 2 L of dilute hydrochloric acid, crystals were educted, and the educted crystals were filtered, separated, and cleaned using 1 L of dilute hydrochloric acid and subsequently 1 L of water. The obtained wet cake was dispersed in 1 L of acetonitrile and heated and stirred at 45° C. for 30 minutes, crystals were filtered and separated, the crystals were dried using a fan dryer machine at 60° C. after a small amount of acetonitrile was poured thereon to clean the crystals, and a rough body of an intermediate body (1-7-e) was obtained. The yield was 80 g. MS (m/z) 602.2 ($M^+$, 100%), 603.2 ($[M+1]^{+1}$).

Synthesis of Intermediate Body (1-7-h)

10 g of the intermediate body (1-7-e) was added in portions to 100 g of phosphorus oxychloride and reacted at 60° C. for 2 hours. The reaction liquid was left to cool down to room temperature and poured into 700 g of ice water, crystal were educted, and the educted crystals were filtered, separated, and cleaned using cold water. 85.8 g of 1,1,3,3-tetramethylbutylamine was separately added to 300 mL of dichloromethane and cooled to 5° C. or less. The previously filtered and separated wet cake was added in portions thereto such that the inner temperature did not exceed 10° C. and, after completing the addition, the reaction liquid was returned to room temperature and reacted at room temperature for 6 hours. The obtained reaction liquid was condensed using a rotary evaporator, 500 mL of n-hexane was added to the residue, excess unreacted 1,1,3,3-tetramethylamine was removed by decantation, the obtained residue was purified using silica gel chromato (filling agent: Wakogel C200 (produced by Wako Pure Chemical Industries, Ltd., product name), developing solvent: chloroform/methanol=20/1, v/v), and glossy crystals of an intermediate body (1-7-h) were obtained. The yield was 10.2 g. MS (m/z) 713.3 ($M^+$, 100%), 714.3 ($[M+1]^+$).

Synthesis of Exemplary Compound (1-7)

5.0 g of the intermediate body (1-7-h) was added in portions to 50 g of chlorosulfonic acid and 6.2 g of phosphorus oxychloride and reacted at 60° C. for 2 hours. The obtained reaction liquid was left to cool down to room temperature and poured into 250 g of ice water, crystals were educted, and the obtained crystals were filtered, separated, and cleaned using cold water. The obtained wet cake was dispersed in 200 mL of water, the pH was adjusted to 9 using 2N sodium hydroxide, and 2N sodium hydroxide was added and stirred therein until there was no change from pH 9. The pH of the obtained reaction liquid was adjusted to 8 using dilute hydrochloric acid and purified using gel cirrmato (filling agent: Sephadex LH-20 (produced by Pharmacia Corporation, product name), developing solvent: water/methanol=/1/1, v/v) after removing salt using a dialysis tube, and a glossy crystal of the exemplary compound (1-7) was obtained. The yield was 5.0 & MS (m/z, nega)=1032 ([M−1]⁻, 100%). The maximal absorption wavelength in the diluted solution in the aqueous solution was 531 nm. FIG. 1 shows the absorption spectrum data.

Synthesis of Exemplary Compound (1-2)

The exemplary compound (1-2) was obtained in the same manner using the same synthesis method as the synthesis of the exemplary compound (1-7) apart from changing the 1,1,3,3-tetramethylbutylamine in the synthesis of the intermediate body (1-7-h) to n-butylamine. The yield was 4.6 g, MS (m/z, nega)=976 ([M−1]⁻·100%). The maximal absorption wavelength in the diluted solution in the aqueous solution was 531 nm.

Synthesis of Exemplary Compound (1-3)

The exemplary compound (1-3) was obtained in the same manner using the same synthesis method as in the synthesis of the exemplary compound (1-7) apart from changing 1,1,3,3-tetramethylbutylamine in the synthesis of the intermediate body (1-7-h) to 2,2,6,6-tetramethylpiperidine-4-ilamine. The yield was 3.2 g, MS (m/z, nega)=1060 ([M−1]⁻, 100%). The maximal absorption wavelength in the diluted solution in the aqueous solution was 532 nm.

Synthesis of Exemplary Compound (1-4)

The exemplary compound (1-4) was obtained in the same manner using the same synthesis method as in the synthesis of the exemplary compound (1-7) apart from changing 1,1,3,3-tetramethylbutylamine in the synthesis of the intermediate body (1-7-h) to tert-butylamine. The yield was 2.0 g, MS (m/z, nega)=976 ([M−1]⁻, 100%). The maximal absorption wavelength in the diluted solution in the aqueous solution was 531 nm.

Synthesis of Exemplary Compound (1-5)

The exemplary compound (1-5) was obtained in the same manner using the same synthesis method as in the synthesis of the exemplary compound (1-7) apart from changing 1,1,3,3-tetramethylbutylamine in the synthesis of the intermediate body (1-7-h) to dicyclohexylamine. The yield was 1.2 g, MS (m/z, nega)=1085 ([M−1]⁻, 100%). The maximal absorption wavelength in the diluted solution in the aqueous solution was 530 nm.

Synthesis of Exemplary Compound (1-6)

The exemplary compound (1-6) was obtained in the same manner using the same synthesis method as in the synthesis of the exemplary compound (1-7) apart from changing 1,1,3,3-tetramethylbutylamine in the synthesis of the intermediate body (1-7-h) to 2-ethylhexylamine. The yield was 4.4 g, MS (m/z, nega)=1055 ([M−1]⁻, 100%). The maximal absorption wavelength in the diluted solution in the aqueous solution was 531 nm.

Synthesis of Exemplary Compound (1-10)

The exemplary compound (1-10) was obtained in the same manner using the same synthesis method as in the synthesis of the exemplary compound (1-7) apart from changing 1,1,3,3-tetramethylbutylamine in the synthesis of the intermediate body (1-7-h) to 2,4-bis(2-hydroxyethyl amino)-6-(4-aminocyclohexyl amino)-1,3,5-triazine. The yield was 5.2 g, MS (m/z, nega)=1215 ([M−1]⁻, 100%). The maximal absorption wavelength in the diluted solution in the aqueous solution was 531 nm.

Synthesis of Exemplary Compound (1-13)

The exemplary compound (1-13) was obtained in the same manner using the same synthesis method as in the synthesis of the exemplary compound (1-7) apart from changing 1,1,3,3-tetramethylbutylamine in the synthesis of the intermediate body (1-7-h) to isopropylamine. The yield was 6.4 g, MS (m/z, nega)=962 ([M−1]⁻, 100%). The maximal absorption wavelength in the diluted solution in the aqueous solution was 531 nm.

Synthesis of Exemplary Compound (1-14)

The exemplary compound (1-14) was obtained in the same manner using the same synthesis method as in the synthesis of the exemplary compound (1-7) apart from changing 1,1,3,3-tetramethylbutylamine in the synthesis of the intermediate body (1-7-h) to isobutylamine. The yield was 5.2 g, MS (m/z, nega) 966 ([M−1]⁻, 100%). The maximal absorption wavelength in the diluted solution in the aqueous solution was 531 nm.

Synthesis of Exemplary Compound (1-16)

The exemplary compound (1-16) was obtained in the same manner using the same synthesis method as the synthesis of the exemplary compound (1-7) apart from changing 1,1,3,3-tetramethylbutylamine in the synthesis of the intermediate body (1-7-h) to cyclohexylamine. The yield was 4.4 g, MS (m/z, nega)=1003 ([M−1]⁻, 100%). The maximal absorption wavelength in the diluted solution in the aqueous solution was 531 nm.

Synthesis of Exemplary Compound (1-20)

The exemplary compound (1-20) was obtained in the same manner using the same synthesis method as in the synthesis of the exemplary compound (1-7) apart from changing 2,4,6-trimethylaniline in the synthesis of the intermediate body (1-7-e) to 2,6-diisopropylamine. The yield was 3.2 g, MS (m/z, nega)=1166 ([M−1]⁻, 100%). The maximal absorption wavelength in the diluted solution in the aqueous solution was 531 nm.

Synthesis of Exemplary Compound (1-21)

The exemplary compound (1-21) was obtained in the same manner using the same synthesis method as in the synthesis of the exemplary compound (1-7) apart from changing 2,4,6-trimethylaniline in the synthesis of the intermediate body (1-7-e) to 3-(isobutyryl amino)-2,4,6-trimethylaniline. The yield was 5.1 g, MS (m/z, nega)=1032 ([M−1]⁻, 100%). The maximal absorption wavelength in the diluted solution in the aqueous solution was 531 nm.

Synthesis of Exemplary Compound (1-22)

The exemplary compound (1-22) was obtained in the same manner using the same synthesis method as in the synthesis of the exemplary compound (1-7) apart from changing 2,4,6-trimethylaniline in the synthesis of the intermediate body (1-7-e) to 3-mecyl amino-2,4,6-trimethylaniline. The yield was 3.4 g, MS (m/z, nega)=1202 ([M−1]−, 100%). The maximal absorption wavelength in the diluted solution in the aqueous solution was 531 nm.

It is also possible to synthesize the other exemplary compounds on the basis of the methods described above.

Example 1

Deionized water was added to the components below to make the total thereof 100 g and stirred for 1 hour while heating at 30° C. to 40° C. After that, the pH was adjusted to 9 at KOH 10 mol/L and a magenta ink liquid was prepared by reducing the pressure and filtering using a micro filter with an average pore diameter of 0.25 μm.

Composition of Ink Liquid 1:

| | |
|---|---|
| Dye (Compound (1-1) below) | 3.50 g |
| Diethylene glycol | 10.65 g |
| Glycerine | 14.70 g |
| Diethylene glycol monobutyl ether | 12.70 g |
| Triethanolamine | 0.65 g |
| Olfine E 1010 (produced by Nissin Chemical Industry Co., Ltd.) | 0.9 g |

Examples 2 to 11 and Comparative Examples 1 to 3

Ink liquids using the comparative compounds 1 to 3 shown below were prepared as ink liquids 2 to 11 and a comparative ink liquid in the same manner as the preparation of ink liquid 1 apart from changing the dye as shown in Table 1 below.

(Image Recording and Evaluation)

The following evaluation was carried out for the ink for inkjet recordings in each of the Examples and Comparative Examples above. Table 1 shows the results.

Here, in Table 1, the ozone resistance, the light fastness, and the moisture resistance were evaluated after recording an image on photo glossy paper (PM photo paper <Koutaku> produced by Seiko Epson Corporation (KA420PSK, EPSON)) using an inkjet printer (produced by Seiko Epson Corporation; PM-700C) using each ink for inkjet recording. The printing density was evaluated after recording a solid coated image on plain paper (plain paper (GF500, Canon) produced by Canon Inc.) using an inkjet printer (manufactured by Seiko Epson Corporation; PM-700C) using each ink for inkjet recording.

<Printing Density>

The solid coated image created as described above was measured using a reflection density meter (X-Rite 310TR) and evaluation was carried out using three ratings: A in a case where the printing density was 2.2 or more, B in a case where the printing density was 2.0 or more to less than 2.2, and C in a case where the printing density was less than 2.0.

<Light Fastness>

After measuring an image density Ci directly after recording the image was irradiated with xenon light (100 thousand lux) for 7 days using a weather meter (Atlas C165) and then an image density Cf was measured again, and the pigment residue rate (Cf/Ci×100%) was calculated and evaluated from the difference in the image density before and after xenon light irradiation. The image density was measured using a reflection density meter (X-Rite 310TR).

The pigment residue rate was measured at three points where the reflection density was 1.0, 1.5, and 2.0. For all the density points, evaluation was carried out using three ratings: A in a case where the pigment residue rate was 80% or more, B in a case where one or two density points were less than 80%, and C in a case where the pigment residue rate was less than 80% in all the density points.

<Ozone Resistance>

A 5 kV AC voltage was applied while passing dry air into a double glass tube of a Siemens ozonizer and, using this, photo glossy paper on which the image described above was formed was left in a box which was set in a dark place where the ozone gas density was 5±0.1 ppm at room temperature for 7 days, the image density before and after being left in the ozone gas was measured using a reflection density meter (X-Rite 310TR), and evaluated as the pigment residue rate. Here, the pigment residue rate was measured at three points where the reflection density described above was 1.0, 1.5, and 2.0. The ozone gas concentration in the box was set using an ozone gas monitor manufactured by Applies (model: OZG-EM-01).

At all concentrations, evaluation was carried out using three ratings: A in a case where the pigment residue rate was 70% or more, B in a case where one or two density points were less than 70%, and C in a case where the pigment residue rate was less than 70% at all the density points.

<Moisture Resistance>

At the time of inkjet recording, a checked pattern (a pattern where squares with corners at 1.5 mm and with densities of 100% and 0% are alternately combined) was produced and a high contrast magenta white checked printed article was obtained. After printing, the checked printed article which was dried for 24 hours was left for 7 days under conditions of 80° C. and 70% RH relative humidity, the degree of bleeding from a colored portion to a white portion was visually evaluated, and the evaluation was carried out using three ratings: A in a case of almost no bleeding, B in a case of a little bleeding, and C in a case of obvious bleeding.

TABLE 1

| Example Comparative Example | Dye Compound | Printing Density | Light fastness | Ozone Resistance | Moisture Resistance |
|---|---|---|---|---|---|
| Example 1 | Compound 1-1 | B | B | A | B |
| Example 2 | Compound 1-2 | B | B | A | B |
| Example 3 | Compound 1-4 | A | A | A | B |
| Example 4 | Compound 1-7 | A | A | A | B |
| Example 5 | Compound 1-8 | A | A | A | B |
| Example 6 | Compound 1-9 | A | B | A | B |
| Example 7 | Compound 1-10 | A | A | A | A |
| Example 8 | Compound 1-11 | A | A | A | B |
| Example 9 | Compound 1-14 | A | A | A | B |
| Example 10 | Compound 1-16 | A | A | A | B |
| Example 11 | Compound 1-25 | A | A | A | A |
| Comparative Example 1 | Comparative Compound 1 | A | B | A | C |
| Comparative Example 2 | Comparative Compound 2 | A | C | A | C |
| Comparative Example 3 | Comparative Compound 3 | A | C | B | C |

As is clear from the results of Table 1, the inks in the examples using the compounds of the present invention have excellent printing density and ozone resistance and excellent light fastness and moisture resistance.

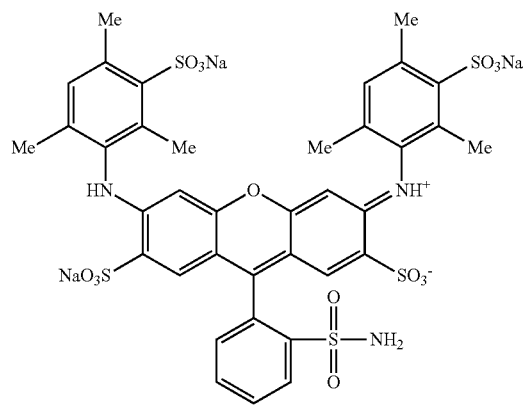
(1-1)
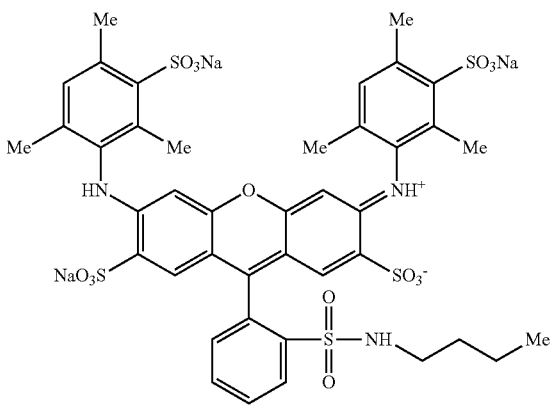
(1-2)
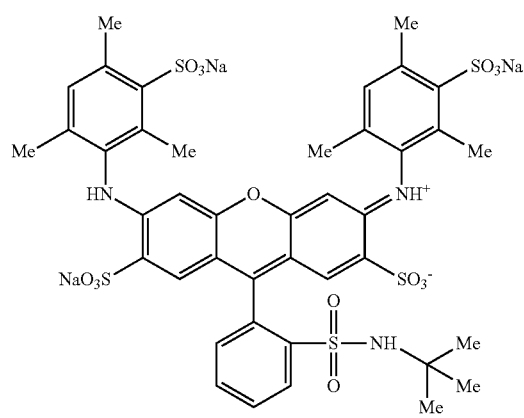
(1-4)
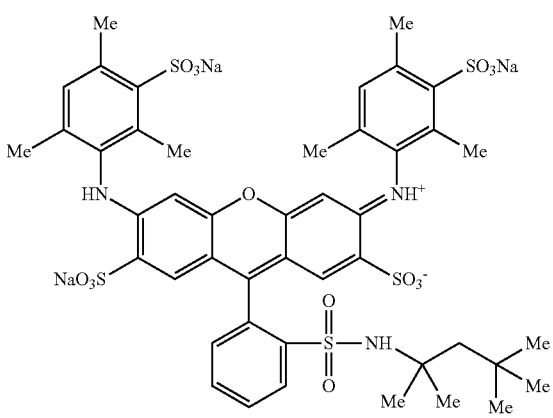
(1-7)
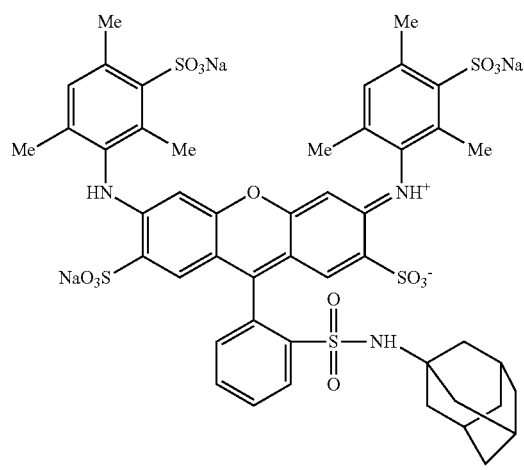
(1-8)
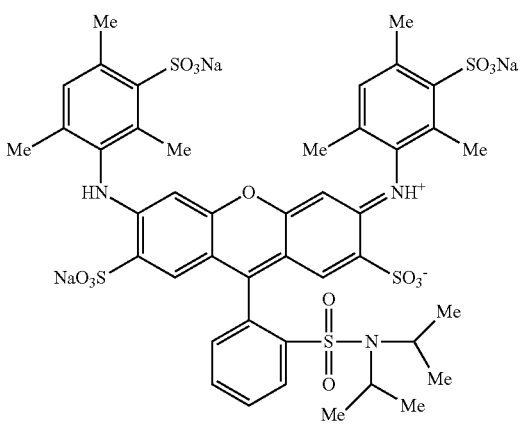
(1-9)

-continued
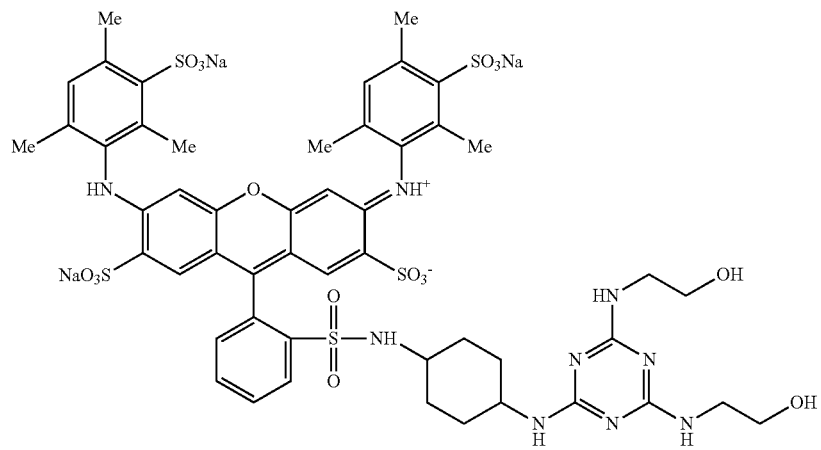
(1-10)
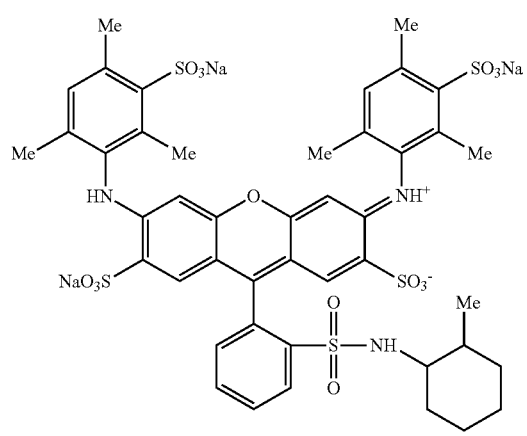
(1-11)
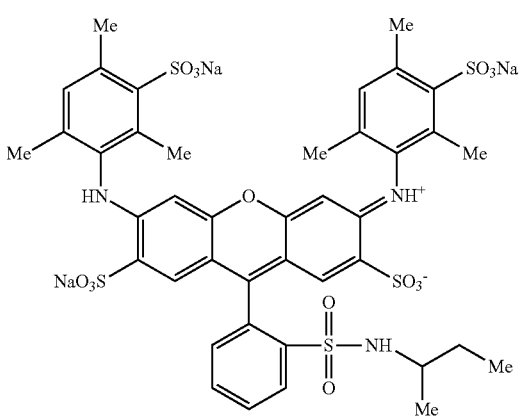
(1-14)
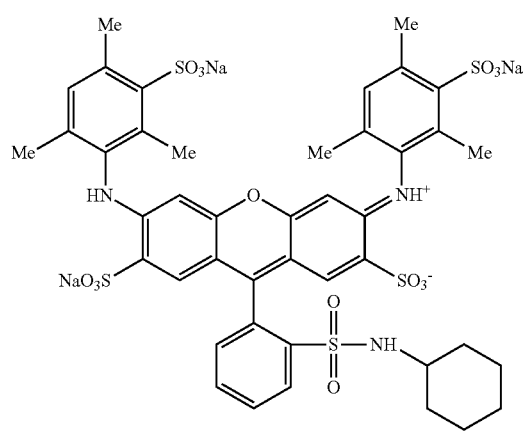
(1-16)

(1-25)
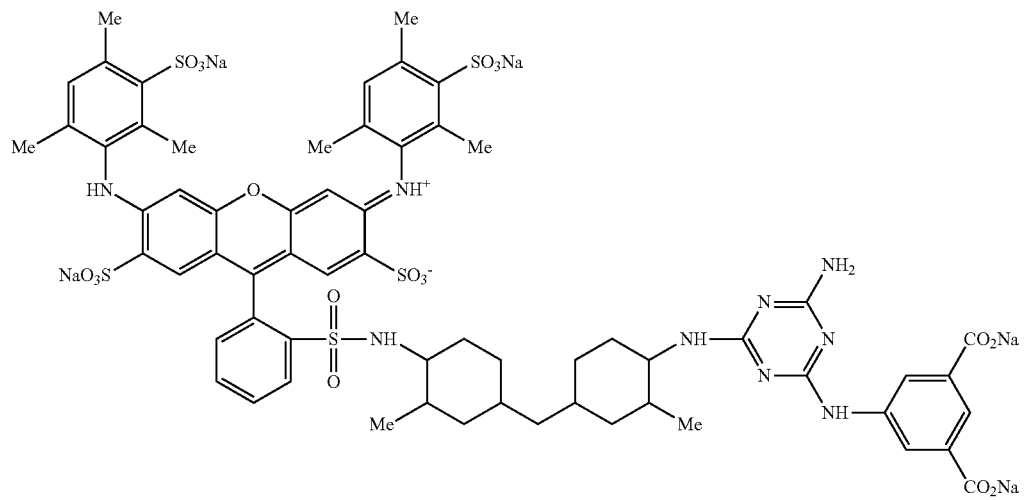
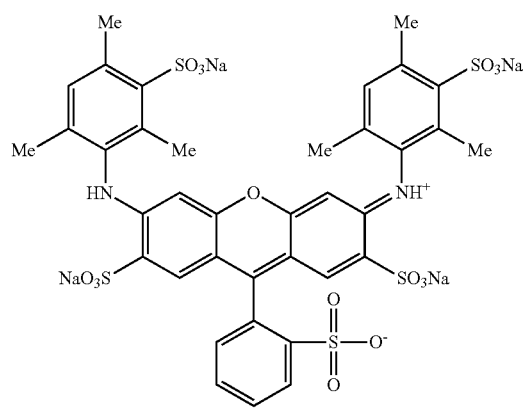
(Comparative Compound 1)
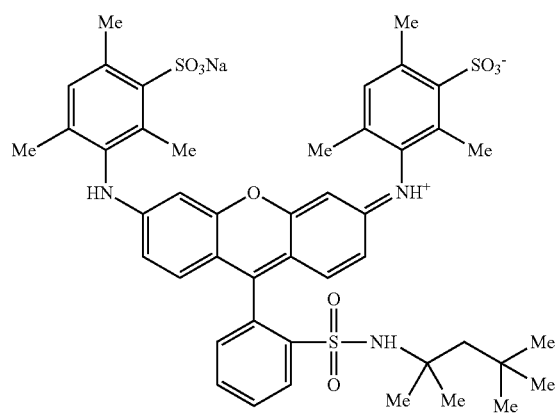
(Comparative Compound 2)
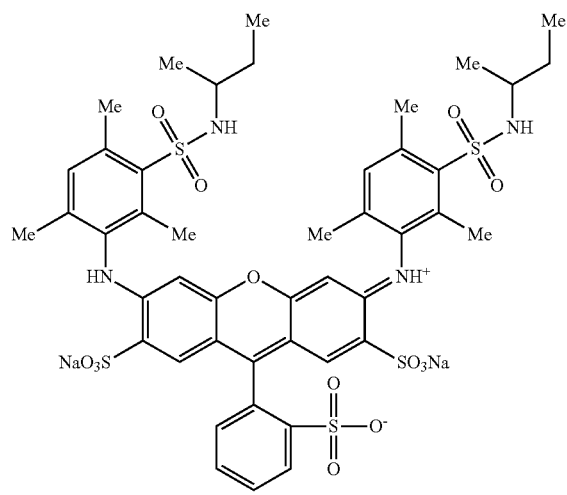
(Comparative Compound 3)

In addition, for all of the ink liquids of the Examples which were created using the exemplary compounds of the present invention, the filtering time during the reducing pressure and filtering with a micro filter was short compared to the comparative compounds, and it is understood that the compounds of the present invention are able to reduce the load in the filter filtration step.

INDUSTRIAL APPLICABILITY

The compound and the colorant composition of the present invention have an excellent printing density and are able to form images with particularly excellent light fastness, ozone resistance, and moisture resistance. In addition, the compounds and the colorant composition of the present invention are favorable for an ink for inkjet recording, an inkjet recording method which uses the ink for inkjet recording described above, an inkjet printer cartridge, and an inkjet recording material.

Description was given of the present invention in detail and with reference to specific embodiments; however, it will be clear to a person skilled in the art that it is possible to add various changes or modifications without departing from the spirit and scope of the present invention.

The present application is based on the Japanese Patent (JP2013-205795) which was applied for on Sep. 30, 2013 and the content thereof is incorporated herein as a reference.

What is claimed is:

1. A compound which is represented by General Formula (1) below:

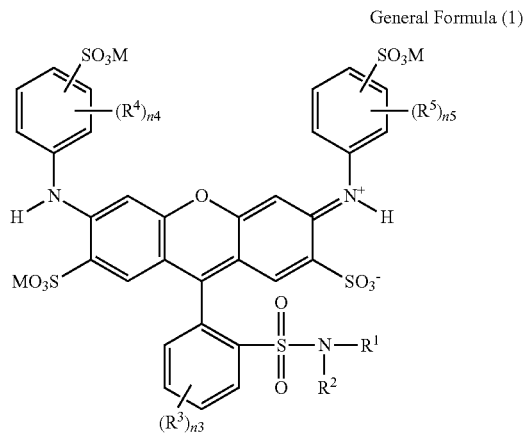

General Formula (1)

in General Formula (1), $R^1$ and $R^2$ each independently represent a hydrogen atom, a substituted or unsubstituted alkyl group, a substituted or unsubstituted aryl group, or a substituted or unsubstituted heterocyclic group, $R^3$, $R^4$, and $R^5$ each independently represent a substituent group, M represents a hydrogen atom or a counter cation, each of M may be the same or different, n3 represents 0, n4, and n5 each independently represent a number between 0 and 4, and $R^4$ and $R^5$ may be the same or different in a case where n4 and n5 each represent a number equal to or greater than 2.

2. The compound according to claim 1, wherein at least one of the $R^1$ and $R^2$ represents a secondary alkyl group or a tertiary alkyl group.

3. The compound according to claim 1, wherein the $R^3$, $R^4$, and $R^5$ each independently represent a halogen atom, an aryl group, an alkoxy group, an alkyl group, an acyl amino group, an alkyl or aryl sulfonyl amino group, or an alkyl or aryl ureide group.

4. The compound according to claim 1, wherein the M represents a lithium ion, a sodium ion, or a potassium ion.

5. A colorant composition which contains the compound according to claim 1.

6. An ink for inkjet recording which includes the colorant composition according to claim 5.

7. An inkjet recording method which uses the ink for inkjet recording according to claim 6.

8. An inkjet printer cartridge which is filled with the ink for inkjet recording according to claim 6.

9. An inkjet recording material forming a color image on a target recording material using the ink for inkjet recording according to claim 6.

* * * * *